(12) United States Patent
Shribman et al.

(10) Patent No.: US 10,958,768 B1
(45) Date of Patent: *Mar. 23, 2021

(54) SYSTEM PROVIDING FASTER AND MORE EFFICIENT DATA COMMUNICATION

(71) Applicant: LUMINATI NETWORKS LTD., Netanya (IL)

(72) Inventors: Derry Shribman, Tel Aviv (IL); Ofer Vilenski, Moshav Hadar Am (IL)

(73) Assignee: LUMINATI NETWORKS LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,392

(22) Filed: Nov. 15, 2020

Related U.S. Application Data

(60) Continuation of application No. 16/600,504, filed on Oct. 13, 2019, which is a continuation of application
(Continued)

(51) Int. Cl.
*H04L 29/06* (2006.01)
*H04L 12/24* (2006.01)
*H04L 29/08* (2006.01)

(52) U.S. Cl.
CPC ............ *H04L 67/42* (2013.01); *H04L 41/046* (2013.01); *H04L 67/1002* (2013.01);
(Continued)

(58) Field of Classification Search
CPC ..... H04L 67/02; H04L 67/42; H04L 67/1002; H04L 67/1023; H04L 67/1063;
(Continued)

(56) References Cited

U.S. PATENT DOCUMENTS 3,922,494 A 11/1975 Cooper et al.
4,347,827 A 9/1982 Lo Cascio
(Continued)

FOREIGN PATENT DOCUMENTS

CN 101075242 A 11/2007
CN 101179389 A 5/2008
(Continued)

OTHER PUBLICATIONS

RFC 3022, Traditional IP Network Address Translator (Traditional Nat), Jan. 2001 (16 pages).
(Continued)

*Primary Examiner* — Minh Chau Nguyen
(74) *Attorney, Agent, or Firm* — May Patents Ltd.

(57) ABSTRACT

A system designed for increasing network communication speed for users, while lowering network congestion for content owners and ISPs. The system employs network elements including an acceleration server, clients, agents, and peers, where communication requests generated by applications are intercepted by the client on the same machine. The IP address of the server in the communication request is transmitted to the acceleration server, which provides a list of agents to use for this IP address. The communication request is sent to the agents. One or more of the agents respond with a list of peers that have previously seen some or all of the content which is the response to this request (after checking whether this data is still valid). The client then downloads the data from these peers in parts and in parallel, thereby speeding up the Web transfer, releasing congestion from the Web by fetching the information from multiple sources, and relieving traffic from Web servers by offloading the data transfers from them to nearby peers.

30 Claims, 15 Drawing Sheets

Related U.S. Application Data

No. 16/278,105, filed on Feb. 17, 2019, now Pat. No. 10,469,628, which is a continuation of application No. 15/957,950, filed on Apr. 20, 2018, now Pat. No. 10,225,374, which is a continuation of application No. 14/025,109, filed on Sep. 12, 2013, now Pat. No. 10,069,936, which is a division of application No. 12/836,059, filed on Jul. 14, 2010, now Pat. No. 8,560,604.

(60) Provisional application No. 61/249,624, filed on Oct. 8, 2009.

(52) U.S. Cl.
CPC ........ *H04L 67/108* (2013.01); *H04L 67/1023* (2013.01); *H04L 67/1063* (2013.01); *H04L 67/22* (2013.01); *H04L 67/2814* (2013.01); *H04L 67/2819* (2013.01); *H04L 67/02* (2013.01)

(58) Field of Classification Search
CPC ..... H04L 67/108; H04L 67/22; H04L 41/046; H04L 41/00
See application file for complete search history.

(56) References Cited

U.S. PATENT DOCUMENTS

| | | | |
|---|---|---|---|
| 4,855,894 A | 8/1989 | Asahi | |
| 4,937,781 A | 6/1990 | Lee | |
| 5,519,693 A | 5/1996 | Galuszka | |
| 5,577,243 A | 11/1996 | Sherwood et al. | |
| 5,734,829 A | 3/1998 | Robinson | |
| 5,758,195 A | 5/1998 | Balmer | |
| 5,826,014 A | 10/1998 | Coley | |
| 5,974,566 A | 10/1999 | Ault | |
| 6,012,083 A * | 1/2000 | Savitzky | G06F 40/221 709/202 |
| 6,012,090 A | 1/2000 | Chung | |
| 6,061,278 A | 5/2000 | Kato et al. | |
| 6,134,584 A | 10/2000 | Chang | |
| 6,154,782 A | 11/2000 | Kawaguchi | |
| 6,173,330 B1 | 1/2001 | Guo et al. | |
| 6,185,625 B1 | 2/2001 | Tso | |
| 6,266,704 B1 | 7/2001 | Reed | |
| 6,311,216 B1 | 10/2001 | Smith | |
| 6,389,422 B1 | 5/2002 | Doi | |
| 6,389,462 B1 | 5/2002 | Cohen | |
| 6,421,733 B1 | 7/2002 | Tso | |
| 6,466,470 B1 | 10/2002 | Chang | |
| 6,513,061 B1 | 1/2003 | Ebata | |
| 6,519,693 B1 | 2/2003 | Debey | |
| 6,665,715 B1 | 12/2003 | Houri | |
| 6,687,732 B1 | 2/2004 | Bector | |
| 6,701,374 B2 | 3/2004 | Gupta | |
| 6,785,705 B1 | 8/2004 | Kocherlakota | |
| 6,795,848 B1 | 9/2004 | Border et al. | |
| 6,842,463 B1 | 1/2005 | Drwiega | |
| 6,868,453 B1 | 3/2005 | Watanabe | |
| 6,895,011 B1 | 5/2005 | Lassers | |
| 6,961,783 B1 | 11/2005 | Cook | |
| 7,007,228 B1 | 2/2006 | Carro | |
| 7,047,315 B1 | 5/2006 | Srivastava | |
| 7,009,927 B2 | 8/2006 | Cudd | |
| 7,120,666 B2 | 10/2006 | McCanne et al. | |
| 7,203,741 B2 | 4/2007 | Marco et al. | |
| 7,234,059 B1 | 6/2007 | Beaver | |
| 7,558,942 B1 | 7/2009 | Chen et al. | |
| 7,620,703 B1 | 11/2009 | Shteyn | |
| 7,673,048 B1 | 3/2010 | O'Toole | |
| 7,706,362 B1 | 4/2010 | Senthilnathan | |
| 7,719,971 B1 | 5/2010 | Issa | |
| 7,742,485 B2 | 6/2010 | Zhang | |
| 7,751,628 B1 | 7/2010 | Reisman | |
| 7,783,777 B1 | 8/2010 | Pabla | |
| 7,788,378 B2 | 8/2010 | Rao | |
| 7,805,517 B2 | 9/2010 | Shim | |
| 7,818,430 B2 | 10/2010 | Zuckerman | |
| 7,831,720 B1 | 11/2010 | Noureddine | |
| 7,860,988 B2 | 12/2010 | Aoki | |
| 7,865,585 B2 * | 1/2011 | Samuels | H04L 67/28 709/223 |
| 7,890,547 B2 | 2/2011 | Hotti | |
| 7,890,624 B2 | 2/2011 | Bivens | |
| 7,929,429 B2 | 4/2011 | Bornstein | |
| 7,970,835 B2 | 6/2011 | St. Jacques | |
| 7,984,110 B1 | 7/2011 | Raman | |
| 8,135,912 B2 | 3/2012 | Shribman et al. | |
| 8,156,275 B2 | 4/2012 | de Cesare | |
| 8,171,101 B2 | 5/2012 | Gladwin et al. | |
| 8,375,434 B2 | 2/2013 | Cottrell | |
| 8,464,350 B2 | 6/2013 | Kanevsky | |
| 8,479,251 B2 | 7/2013 | Feinleib et al. | |
| 8,499,059 B2 | 7/2013 | Stoyanov | |
| 8,527,631 B1 | 9/2013 | Liang | |
| 8,595,786 B2 | 11/2013 | Choi | |
| 8,639,630 B2 | 1/2014 | Fomenko et al. | |
| 8,719,430 B2 | 5/2014 | Van Ackere | |
| 8,719,505 B2 | 5/2014 | Shribman et al. | |
| 8,769,035 B2 | 7/2014 | Resch et al. | |
| 8,832,179 B2 | 9/2014 | Owen et al. | |
| 8,838,811 B2 | 9/2014 | Chen | |
| 8,935,798 B1 | 1/2015 | Smith | |
| 8,972,602 B2 | 3/2015 | Mithyantha | |
| 8,990,357 B2 | 3/2015 | Graham-Cumming | |
| 9,015,335 B1 | 4/2015 | Gigliotti | |
| 9,059,938 B1 | 6/2015 | Strand | |
| 9,100,320 B2 | 8/2015 | Hsy | |
| 9,122,554 B2 | 9/2015 | Callaghan | |
| 9,154,557 B2 | 10/2015 | Lev-Ran | |
| 9,177,157 B2 | 11/2015 | Binder | |
| 9,201,808 B2 | 12/2015 | Shribman et al. | |
| 9,237,210 B2 | 1/2016 | Liu | |
| 9,253,164 B2 | 2/2016 | Gouge | |
| 9,313,100 B1 | 4/2016 | Jenkins | |
| 9,374,244 B1 | 6/2016 | Reed | |
| 9,418,243 B2 | 8/2016 | Bauer | |
| 9,444,903 B2 | 9/2016 | Nuaimi | |
| 9,979,674 B1 | 5/2018 | Kumar | |
| 9,990,295 B2 | 6/2018 | Shribman et al. | |
| 10,361,911 B2 | 7/2019 | Brandwine | |
| 10,404,791 B2 | 9/2019 | Puri | |
| 10,410,244 B2 | 9/2019 | Toval | |
| 10,484,510 B2 | 11/2019 | Shribman | |
| 10,594,660 B2 | 3/2020 | Smith | |
| 10,637,956 B1 | 4/2020 | Juravicius | |
| 2001/0033583 A1 | 10/2001 | Rabenko et al. | |
| 2001/0054020 A1 * | 12/2001 | Barth | G06Q 30/0613 705/37 |
| 2002/0007413 A1 | 1/2002 | Garcia-Luna-Aceves et al. | |
| 2002/0026517 A1 | 2/2002 | Watson | |
| 2002/0065930 A1 | 5/2002 | Rhodes | |
| 2002/0069241 A1 | 6/2002 | Narlikar et al. | |
| 2002/0091760 A1 | 7/2002 | Rozen | |
| 2002/0103823 A1 | 8/2002 | Jackson | |
| 2002/0120874 A1 | 8/2002 | Shu et al. | |
| 2002/0123895 A1 | 9/2002 | Potekhin | |
| 2002/0133621 A1 | 9/2002 | Marco et al. | |
| 2002/0194292 A1 | 12/2002 | King | |
| 2003/0009518 A1 | 1/2003 | Harrow et al. | |
| 2003/0009583 A1 | 1/2003 | Chan et al. | |
| 2003/0018834 A1 | 1/2003 | Eilers | |
| 2003/0074403 A1 | 4/2003 | Harrow et al. | |
| 2003/0097408 A1 | 5/2003 | Kageyama | |
| 2003/0115364 A1 | 6/2003 | Shu et al. | |
| 2003/0163413 A1 | 8/2003 | Wiczkowski | |
| 2003/0174648 A1 | 9/2003 | Wang et al. | |
| 2003/0187925 A1 | 10/2003 | Inala | |
| 2003/0200307 A1 | 10/2003 | Raju et al. | |
| 2003/0204602 A1 | 10/2003 | Hudson et al. | |
| 2003/0210694 A1 | 11/2003 | Jayaraman et al. | |
| 2003/0229718 A1 | 12/2003 | Tock | |
| 2003/0229785 A1 | 12/2003 | Daseke | |

(56) References Cited

U.S. PATENT DOCUMENTS

| | | |
|---|---|---|
| 2004/0068579 A1 | 4/2004 | Marmigere |
| 2004/0088646 A1 | 5/2004 | Yeager et al. |
| 2004/0107242 A1 | 6/2004 | Vert et al. |
| 2004/0117455 A1 | 6/2004 | Kaminsky |
| 2004/0133692 A1 | 7/2004 | Blanchet |
| 2004/0230593 A1 | 11/2004 | Rudin |
| 2004/0236962 A1 | 11/2004 | Wong |
| 2004/0254907 A1 | 12/2004 | Crow et al. |
| 2004/0263479 A1 | 12/2004 | Shkolnikov |
| 2004/0264506 A1 | 12/2004 | Furukawa |
| 2005/0015552 A1 | 1/2005 | So et al. |
| 2005/0022236 A1 | 1/2005 | Ito et al. |
| 2005/0027782 A1 | 2/2005 | Jalan |
| 2005/0050097 A1 | 3/2005 | Yeh |
| 2005/0096753 A1 | 5/2005 | Arling |
| 2005/0097441 A1 | 5/2005 | Herbach |
| 2005/0108244 A1 | 5/2005 | Riise |
| 2005/0108551 A1 | 5/2005 | Toomey |
| 2005/0165903 A1 | 7/2005 | Doan |
| 2005/0228964 A1 | 10/2005 | Sechrest et al. |
| 2006/0015545 A1 | 1/2006 | Ezra |
| 2006/0036755 A1 | 2/2006 | Abdullah |
| 2006/0039352 A1 | 2/2006 | Karstens |
| 2006/0047844 A1 | 3/2006 | Deng |
| 2006/0059091 A1 | 3/2006 | Wang |
| 2006/0075114 A1 | 4/2006 | Panasyuk |
| 2006/0184647 A1 | 8/2006 | Dixit |
| 2006/0212542 A1* | 9/2006 | Fang ............... H04L 67/104 709/219 |
| 2006/0212584 A1* | 9/2006 | Yu ................. G06F 16/9574 709/227 |
| 2006/0224687 A1 | 10/2006 | Popkin |
| 2006/0259728 A1 | 11/2006 | Chandrasekaran et al. |
| 2006/0271438 A1 | 11/2006 | Shotland |
| 2006/0280191 A1 | 12/2006 | Nishida |
| 2007/0011674 A1 | 1/2007 | Joo |
| 2007/0047452 A1 | 3/2007 | Lohr |
| 2007/0050522 A1 | 3/2007 | Grove |
| 2007/0073878 A1 | 3/2007 | Issa |
| 2007/0088821 A1 | 4/2007 | Sankuratripati |
| 2007/0100839 A1 | 5/2007 | Kim |
| 2007/0142036 A1 | 6/2007 | Wikman |
| 2007/0156855 A1 | 7/2007 | Johnson |
| 2007/0171921 A1 | 7/2007 | Wookey |
| 2007/0174246 A1 | 7/2007 | Sigurdsson |
| 2007/0180111 A1 | 8/2007 | Chmaytelli |
| 2007/0226810 A1 | 9/2007 | Hotti |
| 2007/0239655 A1 | 10/2007 | Agetsuma |
| 2007/0283026 A1 | 12/2007 | Lohmar |
| 2008/0008089 A1 | 1/2008 | Bornstein et al. |
| 2008/0025506 A1 | 1/2008 | Muraoka |
| 2008/0037536 A1 | 2/2008 | Padmanabhan |
| 2008/0071925 A1 | 3/2008 | Leighton |
| 2008/0109446 A1 | 5/2008 | Wang |
| 2008/0125123 A1 | 5/2008 | Dorenbosch |
| 2008/0134258 A1 | 6/2008 | Goose et al. |
| 2008/0196098 A1 | 8/2008 | Cottrell |
| 2008/0201438 A1 | 8/2008 | Mandre |
| 2008/0222244 A1 | 9/2008 | Huang |
| 2008/0222267 A1 | 9/2008 | Horn |
| 2008/0222291 A1 | 9/2008 | Weller |
| 2008/0225710 A1 | 9/2008 | Raja |
| 2008/0228537 A1 | 9/2008 | Monfried |
| 2008/0235391 A1 | 9/2008 | Painter et al. |
| 2008/0235623 A1 | 9/2008 | Li |
| 2008/0086730 A1 | 10/2008 | Vertes |
| 2008/0256175 A1 | 10/2008 | Lee |
| 2008/0263180 A1 | 10/2008 | Hurst |
| 2008/0320151 A1 | 12/2008 | McCanne |
| 2009/0010426 A1 | 1/2009 | Redmond |
| 2009/0037529 A1 | 2/2009 | Armon-Kest |
| 2009/0070489 A1 | 3/2009 | Lu |
| 2009/0077233 A1 | 3/2009 | Kurebayashi |
| 2009/0150534 A1 | 6/2009 | Miller |
| 2009/0150930 A1 | 6/2009 | Sherwin |
| 2009/0182843 A1 | 7/2009 | Hluchyj |
| 2009/0199000 A1 | 8/2009 | Hsu |
| 2009/0216887 A1 | 8/2009 | Hertle |
| 2009/0217122 A1 | 8/2009 | Yokokawa et al. |
| 2009/0217351 A1 | 8/2009 | Burch |
| 2009/0232003 A1 | 9/2009 | Vasseur |
| 2009/0234970 A1 | 9/2009 | Sun |
| 2009/0248793 A1 | 10/2009 | Jacobsson |
| 2009/0279559 A1 | 11/2009 | Wong et al. |
| 2009/0292816 A1 | 11/2009 | Etchegoyen |
| 2009/0300208 A1 | 12/2009 | Lepeska |
| 2009/0313318 A1 | 12/2009 | Dye |
| 2009/0319502 A1 | 12/2009 | Chalouhi et al. |
| 2009/0327489 A1 | 12/2009 | Swildens |
| 2010/0036954 A1 | 2/2010 | Sakata |
| 2010/0042724 A1 | 2/2010 | Jeon |
| 2010/0066808 A1 | 3/2010 | Tucker et al. |
| 2010/0085977 A1 | 4/2010 | Khalid et al. |
| 2010/0094970 A1 | 4/2010 | Zuckerman |
| 2010/0115063 A1 | 6/2010 | Gladwin et al. |
| 2010/0154044 A1 | 6/2010 | Manku |
| 2010/0161756 A1 | 6/2010 | Lewis |
| 2010/0161760 A1 | 6/2010 | Maloo |
| 2010/0180082 A1 | 7/2010 | Sebastian |
| 2010/0235438 A1 | 9/2010 | Narayanan |
| 2010/0235473 A1 | 9/2010 | Koren |
| 2010/0262650 A1 | 10/2010 | Chauhan |
| 2010/0293555 A1 | 11/2010 | Vepsalainen |
| 2010/0322237 A1 | 12/2010 | Raja |
| 2010/0329270 A1 | 12/2010 | Asati et al. |
| 2011/0007665 A1 | 1/2011 | Dinur |
| 2011/0022582 A1 | 1/2011 | Unnikrishnan |
| 2011/0023125 A1 | 1/2011 | Kim |
| 2011/0035503 A1* | 2/2011 | Zaid ............... H04L 63/0442 709/228 |
| 2011/0066924 A1 | 3/2011 | Dorso |
| 2011/0087733 A1 | 4/2011 | Shribman et al. |
| 2011/0117938 A1 | 5/2011 | Pyo |
| 2011/0128911 A1 | 6/2011 | Shaheen |
| 2011/0154477 A1 | 6/2011 | Parla |
| 2011/0173345 A1 | 7/2011 | Knox |
| 2011/0264809 A1 | 10/2011 | Koster |
| 2011/0314347 A1 | 12/2011 | Nakano et al. |
| 2012/0023212 A1 | 1/2012 | Roth |
| 2012/0096116 A1 | 4/2012 | Mislove |
| 2012/0099566 A1 | 4/2012 | Laine et al. |
| 2012/0124173 A1 | 5/2012 | De et al. |
| 2012/0124239 A1 | 5/2012 | Shribman |
| 2012/0136926 A1 | 5/2012 | Dillon |
| 2012/0144047 A1 | 6/2012 | Armstrong |
| 2012/0164980 A1 | 6/2012 | Van Phan |
| 2012/0166582 A1 | 6/2012 | Binder |
| 2012/0185947 A1 | 7/2012 | Phillips |
| 2012/0198524 A1 | 8/2012 | Celebisoy |
| 2012/0246273 A1 | 9/2012 | Bornstein |
| 2012/0254370 A1 | 10/2012 | Bacher |
| 2012/0254456 A1 | 10/2012 | Visharam |
| 2012/0264520 A1 | 10/2012 | Marsland |
| 2012/0290717 A1 | 11/2012 | Luna |
| 2012/0297041 A1 | 11/2012 | Momchilov |
| 2012/0323674 A1 | 12/2012 | Simmons |
| 2013/0007031 A1 | 1/2013 | Makino |
| 2013/0007232 A1 | 1/2013 | Wang |
| 2013/0007253 A1 | 1/2013 | Li |
| 2013/0019258 A1 | 1/2013 | Bhatia |
| 2013/0047020 A1 | 2/2013 | Hershko |
| 2013/0064370 A1 | 3/2013 | Gouge |
| 2013/0067086 A1 | 3/2013 | Hershko |
| 2013/0072233 A1 | 3/2013 | Sandholm |
| 2013/0080498 A1 | 3/2013 | Desilva |
| 2013/0080575 A1 | 3/2013 | Prince |
| 2013/0083800 A1 | 4/2013 | Lezama Bounine |
| 2013/0117413 A1 | 5/2013 | Kaneko |
| 2013/0157699 A1 | 6/2013 | Talwar |
| 2013/0166768 A1 | 6/2013 | Gouache et al. |
| 2013/0167045 A1 | 6/2013 | Xu |
| 2013/0171964 A1 | 7/2013 | Bhatia |
| 2013/0173756 A1 | 7/2013 | Luna |
| 2013/0201316 A1 | 8/2013 | Binder et al. |

(56) References Cited

U.S. PATENT DOCUMENTS

| | | |
|---|---|---|
| 2013/0212462 A1 | 8/2013 | Athas |
| 2013/0219281 A1 | 8/2013 | Trevelyan |
| 2013/0219458 A1 | 8/2013 | Ramanathan |
| 2013/0263280 A1 | 10/2013 | Cote |
| 2013/0268357 A1 | 10/2013 | Heath |
| 2013/0272519 A1 | 10/2013 | Huang |
| 2013/0304796 A1 | 11/2013 | Jackowski |
| 2013/0326607 A1 | 12/2013 | Feng |
| 2014/0013001 A1 | 1/2014 | Cox |
| 2014/0082260 A1 | 3/2014 | Oh et al. |
| 2014/0189802 A1 | 7/2014 | Montgomery |
| 2014/0199044 A1 | 7/2014 | Gupta |
| 2014/0222974 A1 | 8/2014 | Liu |
| 2014/0244778 A1 | 8/2014 | Wyatt |
| 2014/0258465 A1 | 9/2014 | Li |
| 2014/0301334 A1 | 10/2014 | Labranche |
| 2014/0337308 A1 | 11/2014 | De Francisci Morales |
| 2014/0359081 A1 | 12/2014 | Van Deventer |
| 2014/0376403 A1 | 12/2014 | Shao |
| 2015/0006615 A1 | 1/2015 | Wainner |
| 2015/0016261 A1 | 1/2015 | Backholm |
| 2015/0026239 A1 | 1/2015 | Hofmann |
| 2015/0026341 A1 | 1/2015 | Blacka |
| 2015/0032803 A1 | 1/2015 | Graham-Cumming |
| 2015/0033001 A1 | 1/2015 | Ivanov |
| 2015/0039674 A1 | 2/2015 | Agarwal |
| 2015/0067819 A1 | 3/2015 | Shribman |
| 2015/0135302 A1 | 5/2015 | Cohen |
| 2015/0149431 A1 | 5/2015 | Trevelyan |
| 2015/0189401 A1 | 7/2015 | Yi |
| 2015/0206176 A1 | 7/2015 | Toval |
| 2015/0206197 A1 | 7/2015 | Toval |
| 2015/0244839 A1 | 8/2015 | Horn |
| 2015/0341812 A1 | 11/2015 | Dion |
| 2015/0350362 A1 | 12/2015 | Pollack |
| 2015/0358648 A1 | 12/2015 | Limberg |
| 2015/0372972 A1 | 12/2015 | Kennedy |
| 2016/0021430 A1 | 1/2016 | LaBosco et al. |
| 2016/0035019 A1 | 2/2016 | Rosner |
| 2016/0098049 A1 | 4/2016 | Fan |
| 2016/0105530 A1 | 4/2016 | Shribman |
| 2016/0170814 A1 | 6/2016 | Li |
| 2016/0323409 A1 | 11/2016 | Kölhi |
| 2016/0337464 A1 | 11/2016 | Eriksson |
| 2016/0352628 A1 | 12/2016 | Reddy et al. |
| 2016/0366233 A1 | 12/2016 | Le |
| 2017/0041416 A1 | 2/2017 | Zhou |
| 2017/0221092 A1 | 8/2017 | Toval |
| 2017/0250861 A1 | 8/2017 | Gheorghe |
| 2018/0020324 A1 | 1/2018 | Beauford |
| 2018/0034766 A1 | 2/2018 | Chiba |
| 2018/0042067 A1 | 2/2018 | Nirantar |
| 2018/0077624 A1 | 3/2018 | Jung |
| 2018/0225387 A1 | 8/2018 | Pang |
| 2018/0227210 A1 | 8/2018 | Cosgrove |
| 2018/0262388 A1 | 9/2018 | Johnson |
| 2018/0375952 A1 | 12/2018 | Knecht |
| 2019/0098518 A1 | 3/2019 | Luna |
| 2019/0138560 A1 | 5/2019 | Holloway |
| 2019/0155665 A1 | 5/2019 | Bott |
| 2019/0180316 A1 | 6/2019 | Toval |
| 2019/0199611 A1 | 6/2019 | Kotadia |
| 2019/0238510 A1 | 8/2019 | Li |
| 2020/0007494 A1 | 1/2020 | Prince |
| 2020/0186614 A1 | 6/2020 | Luna |
| 2020/0259893 A1 | 8/2020 | James |
| 2020/0287867 A1 | 9/2020 | Knecht |

FOREIGN PATENT DOCUMENTS

| | | |
|---|---|---|
| CN | 102314348 | 1/2012 |
| EP | 0948176 A2 | 10/1999 |
| EP | 2597869 A1 | 5/2013 |
| EP | 2597869 A1 | 5/2015 |
| EP | 2922275 B1 | 3/2016 |
| GB | 2418108 A | 3/2006 |
| JP | H11-355302 | 12/1999 |
| JP | 2007280388 | 10/2007 |
| KR | 1020090097034 | 9/2009 |
| RU | 2343536 C2 | 1/2009 |
| WO | 2000/018078 A1 | 3/2000 |
| WO | 2004094980 | 11/2004 |
| WO | 2004094980 A2 | 11/2004 |
| WO | 2007/136665 | 11/2007 |
| WO | 2010090562 A1 | 1/2010 |
| WO | 2010090562 A1 | 8/2010 |
| WO | 2011068784 A1 | 6/2011 |
| WO | 2015034752 A1 | 3/2015 |
| WO | 2015/157646 | 10/2015 |
| WO | 2019/043687 | 3/2019 |

OTHER PUBLICATIONS

RFC 2068, Hypertext Transfer Protocol—HTTP/1.1, Jan. 1997 (162 pages).
RFC 1919, Classical versus Transparent IP Proxies, Mar. 1996 (35 pages).
HAProxy Reference Manual, Version 12.18, Willy Tarreau, May 25, 2008 (40 pages).
HAProxy Architecture Guide, Version 1.2.18, Willy Tarreau, May 25, 2008 (23 pages).
RFC 2663 entitled: "IP Network Address Translator (NAT) Terminology and Considerations", Aug. 1999 (30 pages).
Reed et al, "Anonymous Connections and Onion Routing", Naval Research Laboratory, Mar. 1998 https://www.onion-router.net/Publications/JSAC-1998.pdf (Year: 1998).
International Search Report issued in PCT Application No. PCT/US2010/051881 dated Dec. 9, 2010.
Supplementary European Search Report issued in EP Application No. 10822724 dated Apr. 24, 2013.
"Keep Alive"—Imperva, 2019 https://www.imperva.com/learn/performance/keep-alive (2019) (3 pages).
Third party observation filed on Jun. 21, 2019 in PCT Application No. PCT/IL2018/050910 (7 pages).
IETF named: IPv6 Tunnel Broker, Apr. 1999—First uploaded document submitted with third party observation dated Jun. 21, 2019 (13 pages).
RFC 3053 (Jan. 2001) named: IPv6 Tunnel Broker—Secod uploaded document submitted with third party observation dated Jun. 21, 2019 (13 pages).
Kozierok, The TCP/IP Guide—TCP Connection Preparation, Apr. 6, 2005 (3 pages).
Jovovic, Turning your HD TV into an Android SmartTV is easier than you think!, Feb. 26, 2013 (3 pages).
Allen, A Software Developer's Guide to HTTP Part III—Connections, Jan. 26, 2012 (10 pages).
Google Scholar: MorphMix citation in Alessandro Acquisti, et al., Digital Privacy: Theory, Technologies, and Practices (2007) (2 pages).
RFC 959, File Transfer Protocol (FTP), Oct. 1985 (69 pages).
RFC 821, Jonathan B. Postel, Simple Mail Transfer Protocol, Aug. 1982 (70 pages).
RFC 918, Post Office Protocol, Oct. 1984 (5 pages).
RFC 937, Post Office Protocol—Version 2, Feb. 1985 (24 pages).
Roger Dingledine et al., "The Free Haven Project: Distributed Anonymous Storage Service", Dec. 17, 2000 (23 pages).
Michael Freedman et al., "Tartan: A Peer-to-Peer Anonymizing Network Layer", Nov. 18-22, 2002 (14 pages).
RFC 791, DARPA Internet Program Protocol Specification, Sep. 1981 (49 pages).
RFC 1034, "Domain Names—Concepts and Facilities", Nov. 1987 (55 pages).
RFC 1035, "Domain Names—Implementation and Specification", Nov. 1987 (54 pages).
RFC 1939, Post Office Protocol—Version 3, May 1996 (23 pages).
Michael K. Reiter and Aviel D. Rubin, "Crowds: Anonymity for Web Transactions", ACM Transactions on Information and System Security, Nov. 1998 (27 pages).

(56) References Cited

OTHER PUBLICATIONS

Rennhard, Marc, "MorphMix—A Peer-to-Peer based System for Anonymous Internet Access", 2004 (307 pages).
Ari Luotonen, "Web Proxy Servers," ISBN-10: 0136806120, ISBN-13: 978-0136806127, Prentice Hall; 1st Ed. 1998 (452 pages).
RFC 760, DOD Standard Internet Protocol, Jan. 1980 (46 pages).
RFC 2547, BGP/MPLS VPNs, Mar. 1999 (25 pages).
RFC 1180, A TCP/IP Tutorial, Jan. 1991 (28 pages).
RFC 1122, Requirements for Internet Hosts—Communication Layers, Oct. 1989 (116 pages).
Andrei Popescu, Google, Inc, Geolocation API Specification, W3C Working Draft Dec. 22, 2008 (8 pages).
Andrei Popescu, Google, Inc, Geolocation API Specification, W3C Recommendation Oct. 24, 2013 (10 pages).
Yong Wang, et. al., Towards Street-Level Client-Independent IP Geolocation, 2011 (14 pages).
William R. Stanek, Introducing Microsoft Windows Vista 81, 2006 (9 pages).
IETF RFC 2460 "Internet Protocol, Version 6 (IPv6)", Dec. 1998 (39 pages).
IETF RFC 793 "Protocol Specification", Sep. 1981 (90 pages).
IETF RFC 1349 "Type of Service in the Internet Protocol Suite", Jul. 1992 (28 pages).
IEEE Std 802-2001, IEEE Standard for Local and Metropolitan Area Networks: Overview and Architecture, Feb. 7, 2002 (47 pages).
Scott Lowe, Use Resource Monitor to monitor network performance—TechRepublic, Jul. 29, 2011 (11 pages).
Greg Shultz, Windows Vista's Task Manager: The harder-to-detect changes—TechRepublic, Feb. 21, 2007 (16 pages).
Gavin Gear, Windows 8 Task Manager In-Depth, Jun. 6, 2013 (32 pages).
IETF RFC 2914, "Congestion Control Principles", Sep. 2000 (17 pages).
IETF RFC 4026, "Provider Provisioned Virtual Private Network (VPN) Terminology", Mar. 2005 (20 pages).
RFC 2187, "Application of Internet Cache Protocol (ICP), version 2", Sep. 1997 (24 pages).
Duane Wessels, "ICP and the Squid Web Cache", Aug. 13, 1997 (25 pages).
RFC 1738, "Uniform Resource Locators (URL)", Dec. 1994 (25 pages).
European Search Report of EP 20195075 dated Nov. 13, 2020.
David Gourley et al, "HTTP-The-Definitive-Guide", O'Reilly Media, Inc. 27 Sep. 2002 (658 pages).
Floss Manuals, "Circumvention Tools", Free Software Foundation Inc., May 31, 2021 (240 pages).
David Fifield et al, "Blocking resistant communication through domain fronting", Proceeding on Privacy Enhanching Technologies 2015, May 15, 2015 (19 pages).
Wang Qiyan et al, "CensorSpoofer: Asymmetric Communication with IP Spoofing for ensorship-Resistant Web Browsing", Mar 9, 2012 (16 pages).
Third-party submission under 37 CFR 1.290 filed on Jul. 23, 2019 and entered in U.S. Appl. No. 16/140,749.
Third-party submission under 37 CFR 1.290 filed on Jul. 23, 2019 and entered in U.S. Appl. No. 16/140,785.
Third-party submission under 37 CFR 1.290 filed on Jul. 23, 2019 and entered in U.S. Appl. No. 16/214,433.
Third-party submission under 37 CFR 1.290 filed on Jul. 23, 2019 and entered in U.S. Appl. No. 16/214,451.
Third-party submission under 37 CFR 1.290 filed on Jul. 23, 2019 and entered in U.S. Appl. No. 16/214,476.
Third-party submission under 37 CFR 1.290 filed on Jul. 23, 2019 and entered in U.S. Appl. No. 16/214,496.
Third-party submission under 37 CFR 1.290 filed on Jul. 23, 2019 and entered in U.S. Appl. No. 16/292,363.
Third-party submission under 37 CFR 1.290 filed on Jul. 22, 2019 and entered in U.S. Appl. No. 16/292,364.
Third-party submission under 37 CFR 1.290 filed on Jul. 23, 2019 and entered in U.S. Appl. No. 16/292,374.
Third-party submission under 37 CFR 1.290 filed on Jul. 23, 2019 and entered in U.S. Appl. No. 16/292,382.
Third-party submission under 37 CFR 1.290 filed on Jul. 25, 2019 and entered in U.S. Appl. No. 16/365,250.
Third-party submission under 37 CFR 1.290 filed on Jul. 25, 2019 and entered in U.S. Appl. No. 16/365,315.
"Slice Embedding Solutions for Distributed Service Architectures"—Esposito et al., Boston University, Feb. 12, 2011 http://www.cs.bu.edu/techreports/pdf/2011-025-slice-embedding.pdf (Year 2011) (16 pages).
Octoparse Blog: "Top 20 Web Crawling Tools to Scrape the Websites Quickly", Aug. 23, 2019 (15 pages).
Screen captures from YouTube video clip entitle "nVpn.net | Double your Safety and use Socks5 + nVpn" 38 pages, last accessed Nov. 20, 2018 <https://www.youtube.com/watch?v=L0Hct2kSnn4>.
Screen captures from YouTube video clip entitle "Andromeda" 47 pages, publicly known and available as of at least 2011 <https://www.youtube.com/watch?v=yRRYpFLbKNU>.
SpyEye, https://www.symantec.com/security-center/writeup/2010-020216-0135-9; http://securesql.info/riskyclouds/spyeye-user-manual; known as of at least 2010 (13 pages).
Screen captures from YouTube video clip entitle "Change Your Country IP Address & Location with Easy Hide IP Software" 9 pages, publicly known and available as of at least 2011, <https://www.youtube.com/watch?v=ulwkf1sOfdA and https://www.youtube.com/watch?v=iFEMT-o9DTc>.
CoralCDN ("CoralCDN"), https://pdos.csail.mit.edu/6.824/papers/freedman-coral.pdf (14 Pages).
European Search Report for EP 14182547.1, dated Jul. 30, 2015.
R. Fielding et al, RFC 2616: Hypertext Transfer Protocol—HTTP/1.1, Jun. 1999, retrieved from the Internet http://rcf-editor.org [retrieved Apr. 15, 2002].
"On the leakage of personally identifiable information via online social networks", Wills et al. AT&T, Apr. 2009 http://www2.research.att.com/-bala/papers/wosn09.pdr*.
"Slice Embedding Solutions for Distributed Service Architectures"—Esposito et al., Boston University, Computer Science Dept., Oct. 2011 http://www.cs.bu.edu/techreports/pdf/2011-025-slice-embedding.pdf.
International Search Report of PCT/US2010/034072 dated Jul. 1, 2010.
YouTube video clip entitled "nVpn.net | Double your Safety and use Socks5 + nVpn" <https://www.youtube.com/watch?v=L0Hct2kSnn4>.
YouTube video clip entitled "Andromeda" <https://www.youtube.com/watch?v=yRRYpFLbKNU>.
YouTube video clip entitled "Change Your Country IP Address & Location with Easy Hide IP Software" <https://www.youtube.com/watch?v=ulwkf1sOfdA and https://www.youtube.com/watch?v=iFEMT-b9DTc>.
Kei Suzuki, a study on Cooperative Peer Selection Method in P2P Video Delivery, vol. 109, No. 37, IEICE Technical Engineers Report, The Institute of Electronics, Information and Communication, May 14, 2009.
R. Fielding et al, RFC 2616: Hypertext Transfer Protocol—HTTP/1.1, Jun. 1999, retrieved from the Internet http://rcf-editor.org [retrieved Apr. 15, 2002] (114 pages).
"On the Leakage of Personally Identifiable Information via Online Social Networks"—Wills et al, AT&T, Apr. 2009 http://www2.research.att.com/~bala/papers/wosn09.pdf.
Notice of Preliminary Rejection in KR Application No. 10-2012-7011711 dated Jul. 15, 2016.
Kei Suzuki, a study on Cooperative Peer Selection Method in P2P Video Delivery, vol. 109, No. 37, IEICE Technical Report, The Institute of Electronics, Information and Communication Engineers, May 14, 2009.
Berners-Lee et al., RFC 1945, Hypertext Transfer Protocol, HTTP/1.0 (May 1996) (60 pages).
Leech et al., RFC 1928, Socks Protocol, Version 5 (Internet Engineering Task Force, Network Working Group, Mar. 1996) (9 pages).

(56) References Cited

OTHER PUBLICATIONS

Wessels, "Squid: The Definitive Guide," ISBN-10: 9780596001629, ISBN-13: 978-0596001629, O'Reilly Media; 1st Ed. (Jan. 1, 2004) (468 pages).
VIP72.com home page as of 2013 from Wayback Machine (3 pages).
Loutonen et al., "World-Wide Web proxies," Computer Networks and ISDN Systems 27, 147-154 (Elsevier Science B.V.) (1994) (8 pages).
Cooper et al., RFC 3040, Internet Web Replication and Caching Taxonomy (Jan. 2001) (32 pages).
ISO/IEC 23009-1:2012(E), MPEG-DASH standard, Jan. 5, 2012 (133 pages).
ProxyList.net, as captured by the Wayback Machine (web.archive.org), on Jul. 17, 2011 (1 page).
Printout of VIP72 Youtube web page at https://www.youtube.com/watch?v=L0Hct2kSnn4, retrieved Nov. 21, 2019 (1 page).
VIP72 Scene Images extracted from VIP72.com/nvpnnet, MPEG-4 video recording of "nVPN.net | Double your Safety and use Socks5 +nVpn", accessed from https://www.youtube.com/watch?v=L0Hct2kSnn4, published Sep. 11, 2011 (221 pages).
Certification dated Nov. 8, 2019 of Anjali Shresta of Google, Proof of Date for VIP72 Youtube web page and video (4 pages).
Michael J. Freedman, Princeton University, "Experiences with CoralCDN: a five-year operational view", Proceeding NSDI'10 Proceedings of the 7th USENIX conference on Networked systems design and implementation San Jose, California—Apr. 28-30, 2010 (17 pages).
"The BitTorrent Protocol Specification", Website: https://web.archive.org/web/20120513011037/http:/www.bittorrent.org/beps/bep_0003.html describing BitTorrent dated Jan. 10, 2008 downloaded using web archive on Aug. 16, 2019 (6 pages).
"BitTorrent", Website: https://en.wikipedia.org/w/index.php?title=BitTorrent&oldid=530466721 describing BitTorrent dated Dec. 30, 2012 downloaded using Wikipedia on Aug. 16, 2019 (9 pages).
"VIP SOCKS/VPN Service", Website: http://vip72.com:80/?drgn=1 describing VIP72 proxy service dated Jan. 2010 downloaded using VIP Technologies webpage on Aug. 16, 2019 (3 pages).
"Welcome to Easy Hide IP", Website: https://web.archive.org/web/20130702093456/http://www.easy-hide-ip.com:80/ describing Easy Hide IP dated Jun. 26, 2007 downloaded using web archive on Aug. 16, 2019 (2 pages).
"You make it fun; we'll make it run", Website: https://web.archive.org/web/20130726050810/https://www.coralcdn.org describing CoralCDN dated Jan 25, 2005 downloaded using web archive on Aug. 16, 2019 (2 pages).
"Net Transport", Website: http://www.xi-soft.com/default.htm describing Net Transport Overview dated 2005 downloaded using Net Transport webpage on Aug. 16, 2019 (2 pages).
Net Transport—Develop History, Website: http://www.xi-soft.com/download.htm describing Net Transport Download dated 2005 downloaded using Net Transport webpage on Aug. 16, 2019 (10 pages).
Net Transport FAQ, Website: http://www.xi-soft.com/faq.htm describing Net Transport FAQ dated 2005 downloaded using Net Transport webpage on Aug. 16, 2019 (4 pages).
Net Transport News, Website: http://www.xi-soft.com/news.htm describing Net Transport News dated 2005 downloaded using Net Transport webpage on Aug. 16, 2019 (5 pages).
Authors Alain Durand (IMAG) et al., "IPv6 Tunnel Broker <draft-ietf-ngtrans-broker-00.txt>", Internet Society (ISOC), Apr. 2, 1999 (14 pages).
Sophie Gastellier-Prevost et al., "Defeating pharming attacks at the client-side", Network and System Security (NSS), Sep. 6, 2011 (8 pages).
Bharat K et al. "Mirror, Mirror on the Web: a study of host pairs with replicated content", Computer Networks, Amsterdam, vol. 31, No. 11-16, May 17, 1999 (12 pages).
European Search Report of EP 20190259 dated Dec. 16, 2020.
European Search Report of EP 20195090 dated Dec. 8, 2020.

\* cited by examiner

| ACCELERATION DATABASE 164 | | |
|---|---|---|
| 166 AGENT IP A | ONLINE/OFFLINE | |
| >>> INDEXED BY: AGENT IP ADDRESS | | |
| CACHE DATABASE 282 | | |
| 286 LIST OF URLS: | | |
| 288 URL 1 | | |
| 290 URL | | |
| 292 URL HTTP HEADERS | | |
| 294 LAST CHECKED ON SERVER | | |
| 296 LAST CHANGED ON SERVER | | |
| 298 LIST OF CHUNKS FOR THIS URL: | | |
| 300 CHUNK 1 | | |
| 302 CHUNK CHECKSUM | | |
| 304 CHUNK DATA | | |
| 306 LIST OF PEERS: | | |
| 308 PEER 1 | | |
| 310 PEER 1 IP ADDRESS | | |
| 312 PEER 2 CONNECTION STATUS | | |

SYSTEM PROVIDING FASTER AND MORE EFFICIENT DATA COMMUNICATION

CROSS-REFERENCE TO RELATED APPLICATIONS

The present application is a continuation application of U.S. non-provisional patent application Ser. No. 14/025,109, filed Sep. 12, 2013, which is a divisional application of U.S. non-provisional patent application entitled "SYSTEM AND METHOD FOR PROVIDING FASTER AND MORE EFFICIENT DATA COMMUNICATION" having Ser. No. 12/836,059, filed Jul. 14, 2010 and issued as U.S. Pat. No. 8,560,604 on Oct. 15, 2013, and claims priority to U.S. provisional patent application entitled "SYSTEM AND METHOD FOR REDUCING INTERNET CONGESTION," having Ser. No. 61/249,624, filed Oct. 8, 2009, which are hereby incorporated herein by reference in their entirety.

FIELD OF THE INVENTION

The present invention is related to Internet communication, and more particularly, to improving data communication speed and bandwidth efficiency on the Internet.

BACKGROUND OF THE INVENTION

There are several trends in network and Internet usage, which tremendously increase the bandwidth that is being used on the Internet. One such trend is that more and more video is being viewed on demand on the Internet. Such viewing includes the viewing of both large and short video clips. In addition, regular shows and full-featured films may be viewed on the Internet. Another trend that is increasing the traffic on the Internet is that Web sites (such as shopping portals, news portals, and social networks) are becoming global, meaning that the Web sites are serving people in many diverse places on the globe, and thus the data is traversing over longer stretches of the Internet, increasing the congestion.

The increase in bandwidth consumption has created several major problems, a few of which are described below:
The problem for users—the current Internet bandwidth is not sufficient, and thus the effective 'speed' experienced by users is slow;
The problem for content owners—the tremendous amount of data being viewed by users is costing large amounts of money in hosting and bandwidth costs; and
The problem for Internet Service Providers (ISPs)—the growth in Internet traffic is requiring the ISPs to increase the infrastructure costs (communication lines, routers, etc.) at tremendous financial expense.

The need for a new method of data transfer that is fast for the consumer, cheap for the content distributor and does not require infrastructure investment for ISPs, has become a major issue which is yet unsolved.

There have been many attempts at making the Internet faster for the consumer and cheaper for the broadcaster. Each such attempt is lacking in some aspect to become a widespread, practical solution, or is a partial solution in that it solves only a subset of the major problems associated with the increase in Internet traffic. Most of the previous solutions require billions of dollars in capital investment for a comprehensive solution. Many of these attempts are lacking in that much of the content on the Internet has become dynamically created per the user and the session of the user (this is what used to be called the "Web2.0" trend). This may be seen on the Amazon Web site and the Salesforce Web site, for example, where most of the page views on these Web sites is tailored to the viewer, and is thus different for any two viewers. This dynamic information makes it impossible for most of the solutions offered to date to store the content and provide it to others seeking similar content.

One solution that has been in use is called a "proxy". FIG. 1 is a schematic diagram providing an example of use of a proxy within a network 2. A proxy, or proxy server 4, 6, 8 is a device that is placed between one or more clients, illustrated in FIG. 1 as client devices 10, 12, 14, 16, 18, 20, that request data, via the Internet 22, and a Web server or Web servers 30, 32, 34 from which they are requesting the data. The proxy server 4, 6, 8 requests the data from the Web servers 30, 32, 34 on their behalf, and caches the responses from the Web servers 30, 32, 34, to provide to other client devices that make similar requests. If the proxy server 4, 6, 8 is geographically close enough to the client devices 10, 12, 14, 16, 18, 20, and if the storage and bandwidth of the proxy server 4, 6, 8 are large enough, the proxy server 4, 6, 8 will speed up the requests for the client devices 10, 12, 14, 16, 18, 20 that it is serving.

It should be noted, however, that to provide a comprehensive solution for Internet surfing, the proxy servers of FIG. 1 would need to be deployed at every point around the world where the Internet is being consumed, and the storage size of the proxy servers at each location would need to be near the size of all the data stored anywhere on the Internet. The abovementioned would lead to massive costs that are impractical. In addition, these proxy solutions cannot deal well with dynamic data that is prevalent now on the Web.

There have been commercial companies, such as Akamai, that have deployed such proxies locally around the world, and that are serving a select small group of sites on the Internet. If all sites on the Web were to be solved with such a solution, the capital investment would be in the range of billions of dollars. In addition, this type of solution does not handle dynamic content.

To create large distribution systems without the large hardware costs involved with a proxy solution, "peer-to-peer file sharing" solutions have been introduced, such as, for example, BitTorrent. FIG. 2 is a schematic diagram providing an example of a peer-to-peer file transfer network 50. In the network 50, files are stored on computers of consumers, referred to herein as client devices 60. Each consumer can serve up data to other consumers, via the Internet 62, thus taking the load of serving off of the distributors and saving them the associated costs, and providing the consumer multiple points from which to download the data, referred to herein as peers 70, 72, 74, 76, 78, thus increasing the speed of the download. However, each such peer-to-peer solution must have some sort of index by which to find the required data. In typical peer-to-peer file sharing systems, because the index is on a server 80, or distributed among several servers, the number of files available in the system is not very large (otherwise, the server costs would be very large, or the lookup time would be very long).

The peer-to-peer file sharing solution is acceptable in file sharing systems, because there are not that many media files that are of interest to the mass (probably in the order of magnitude of millions of movies and songs that are of interest). Storing and maintaining an index of millions of entries is practical technically and economically. However, if this system were to be used to serve the hundreds of billions of files that are available on the Internet of today, the cost of storing and maintaining such an index would be again in the billions of dollars. In addition, these types of peer-to-peer file sharing systems are not able to deal with dynamic HTTP data.

In conclusion, a system does not exist that enables fast transmission of most of the data on the Internet, that does not incur tremendous costs, and/or that provides only a very partial solution to the problem of Internet traffic congestion. Thus, a heretofore unaddressed need exists in the industry to address the aforementioned deficiencies and inadequacies.

SUMMARY OF THE INVENTION

The present system and method provides for faster and more efficient data communication within a communication network. Briefly described, in architecture, one embodiment of the system, among others, can be implemented as follows. A network is provided for accelerating data communication, wherein the network contains: at least one client communication device for originating a data request for obtaining the data from a data server; at least one agent communication device which is assigned to the data server for receiving the data request from the client communication device, wherein the agent keeps track of which client communication devices have received responses to data requests from the assigned data server; at least one peer communication device for storing portions of data received in response to the data request by the at least one client communication device, wherein the portions of data may be transmitted to the at least one client communication device upon request by the client communication device; and at least one acceleration server for deciding which agent communication device is to be assigned to which data server and providing this information to the at least one client communication device.

The present system and method also provides a communication device within a network, wherein the communication device contains: a memory; and a processor configured by the memory to perform the steps of: originating a data request for obtaining data from a data server; being assigned to a data server, referred to as an assigned data server; receiving a data request from a separate device within the network, and keeping track of which client communication devices within the network have received responses to data requests from the assigned data server; and storing portions of data received in response to the originated data request, wherein the portions of data may be transmitted to communication device upon request by the communication device.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
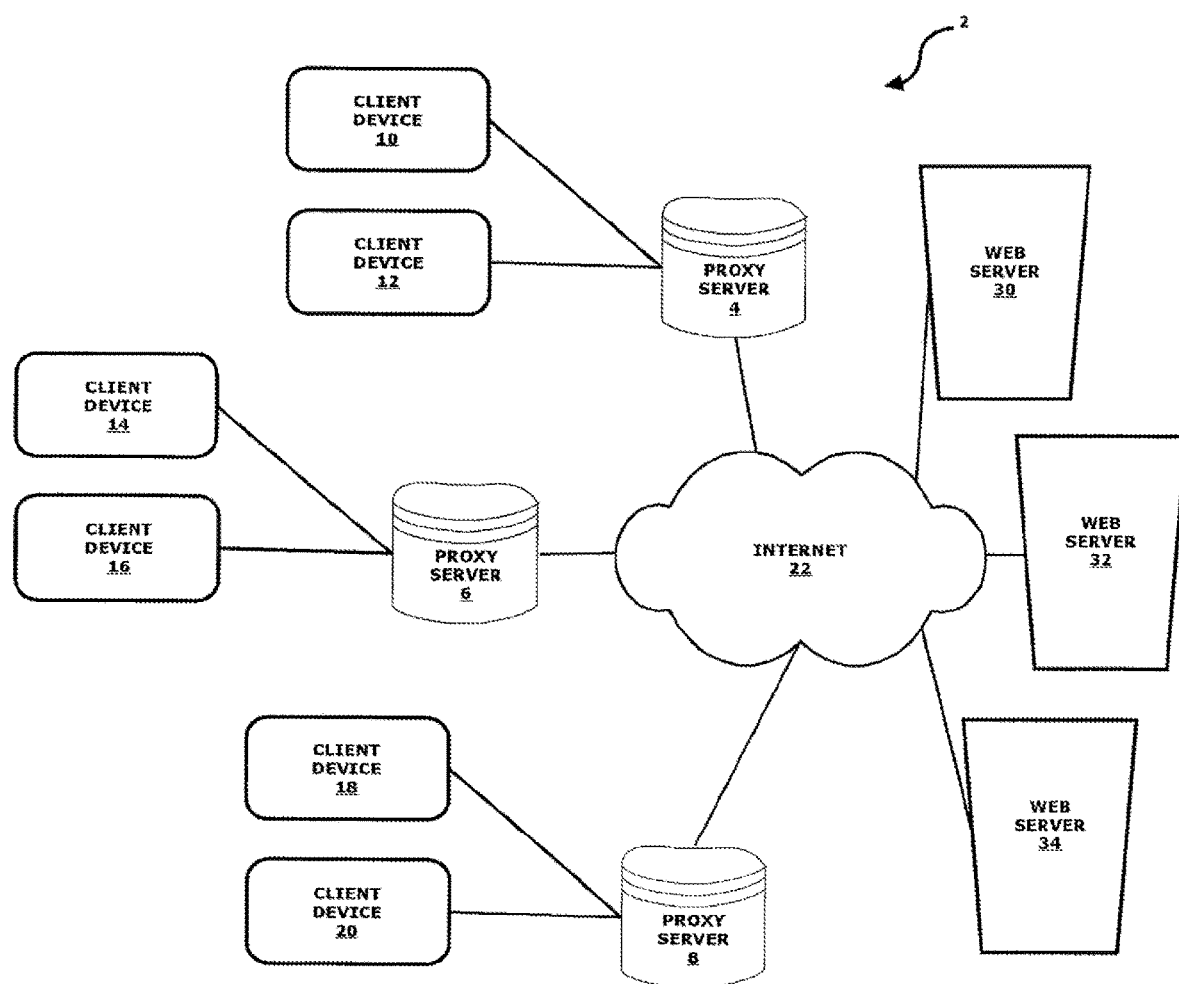
FIG. 1 is a schematic diagram providing a prior art example of use of a proxy within a network.
Figure 2:
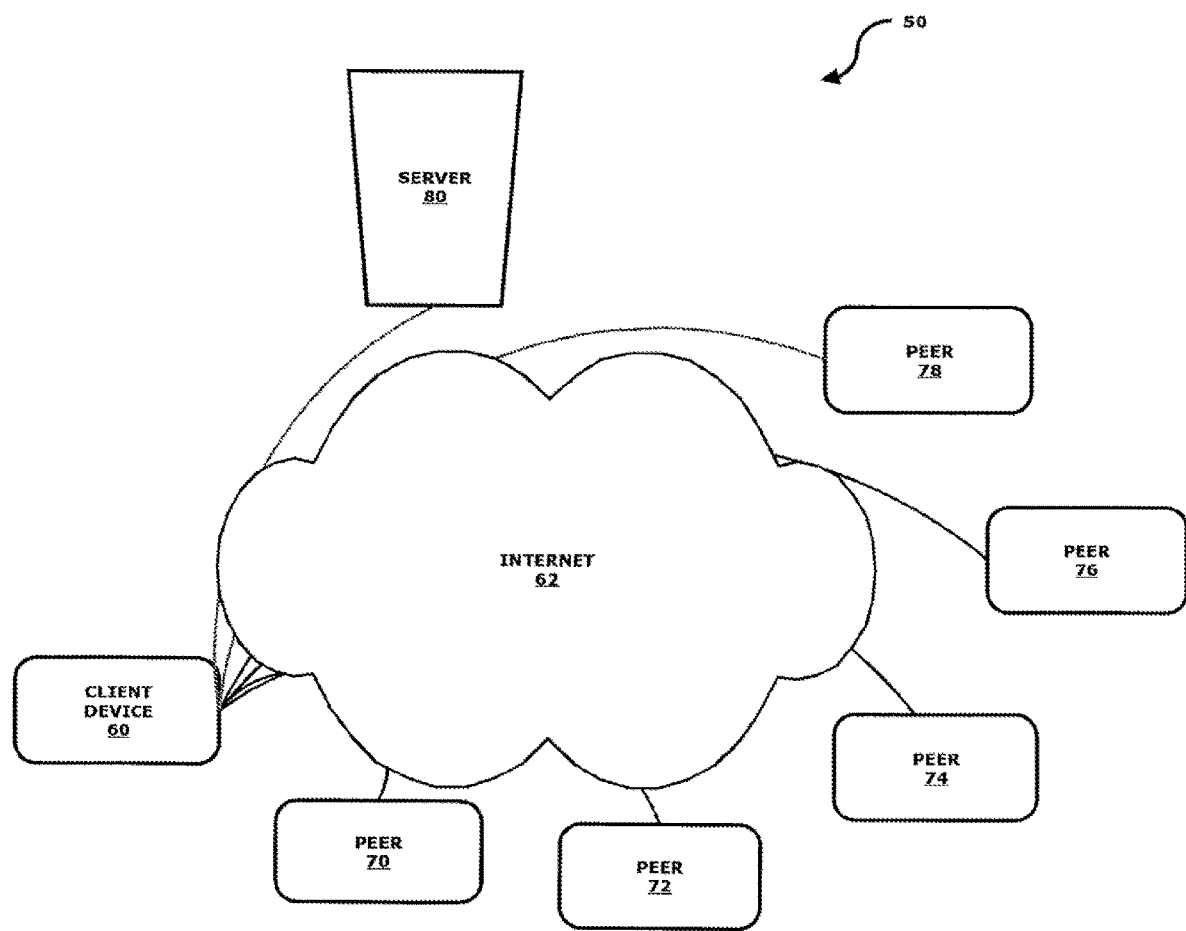
FIG. 2 is a schematic diagram providing a prior art example of a peer-to-peer file transfer network.

The present system and method provides for faster and more efficient data communication within a communication network. An example of such a communication network 100 is provided by the schematic diagram of FIG. 3. The network 100 of FIG. 3 contains multiple communication devices. Due to functionality provided by software stored within each communication device, which may be the same in each communication device, each communication device may serve as a client, peer, or agent, depending upon requirements of the network 100, as is described in detail herein. It should be noted that a detailed description of a communication device is provided with regard to the description of FIG. 4.

Returning to FIG. 3, the exemplary embodiment of the network 100 illustrates that one of the communication devices is functioning as a client 102. The client 102 is capable of communication with one or more peers 112, 114, 116 and one or more agents 122. For exemplary purposes, the network contains three peers and one agent, although it is noted that a client can communicate with any number of agents and peers.

The communication network 100 also contains a Web server 152. The Web server 152 is the server from which the client 102 is requesting information and may be, for example, a typical HTTP server, such as those being used to deliver content on any of the many such servers on the Internet. It should be noted that the server 152 is not limited to being an HTTP server. In fact, if a different communication protocol is used within the communication network, the server may be a server capable of handling a different protocol. It should also be noted that while the present description refers to the use of HTTP, the present invention may relate to any other communication protocol and HTTP is not intended to be a limitation to the present invention.

The communication network 100 further contains an acceleration server 162 having an acceleration server storage device 164. As is described in more detail herein, the acceleration server storage device 164 has contained therein an acceleration server database. The acceleration server database stores Internet protocol (IP) addresses of communication devices within the communication network 100 having acceleration software stored therein. Specifically, the acceleration server database contains stored therein a list of communication devices having acceleration software stored therein that are currently online within the communication network 100. For each such agent, the acceleration server assigns a list of IP addresses.

Figure 3:
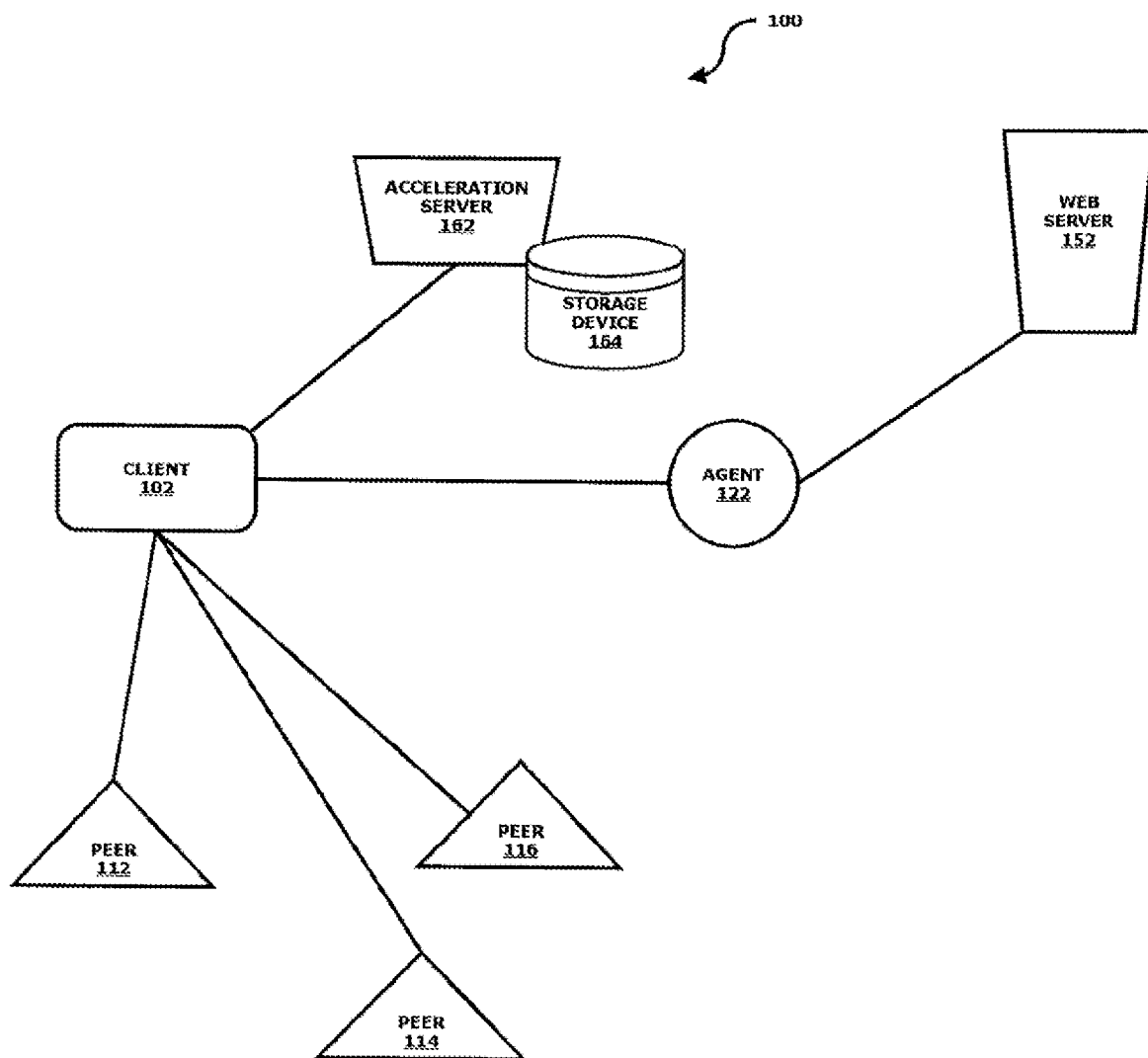
FIG. 3 is a schematic diagram providing an example of a communication network in accordance with the present invention.

In the communication network 100 of FIG. 3, the application in the client 102 is requesting information from the Web server 152, which is why the software within the communication device designated this communication device to work as a client. In addition, since the agent 122 receives the request from the client 102 as the communication device closest to the Web server 152, functionality of the agent 122, as provided by the software of the agent 122, designates this communication device to work as an agent. It should be noted, that in accordance with an alternative embodiment of the invention, the agent need not be the communication device that is closest to the Web server. Instead, a different communication device may be selected to be the agent.

Since the peers 112, 114, 116 contain at least portions of the information sought by the client 102 from the Web server 152, functionality of the peers 112, 114, 116, as provided by the software of the peers 112, 114, 116, designates these communication devices to work as peers. It should be noted that the process of designating clients, agents, and peers is described in detail herein. It should also be noted that the number of clients, agents, peers, acceleration servers, Web servers, and other components of the communication network 100 may differ from the number illustrated by FIG. 3. In fact, the number of clients, agents, peers, acceleration servers, Web servers, and other components of the communication network 100 are not intended to be limited by the current description.

Figure 4:
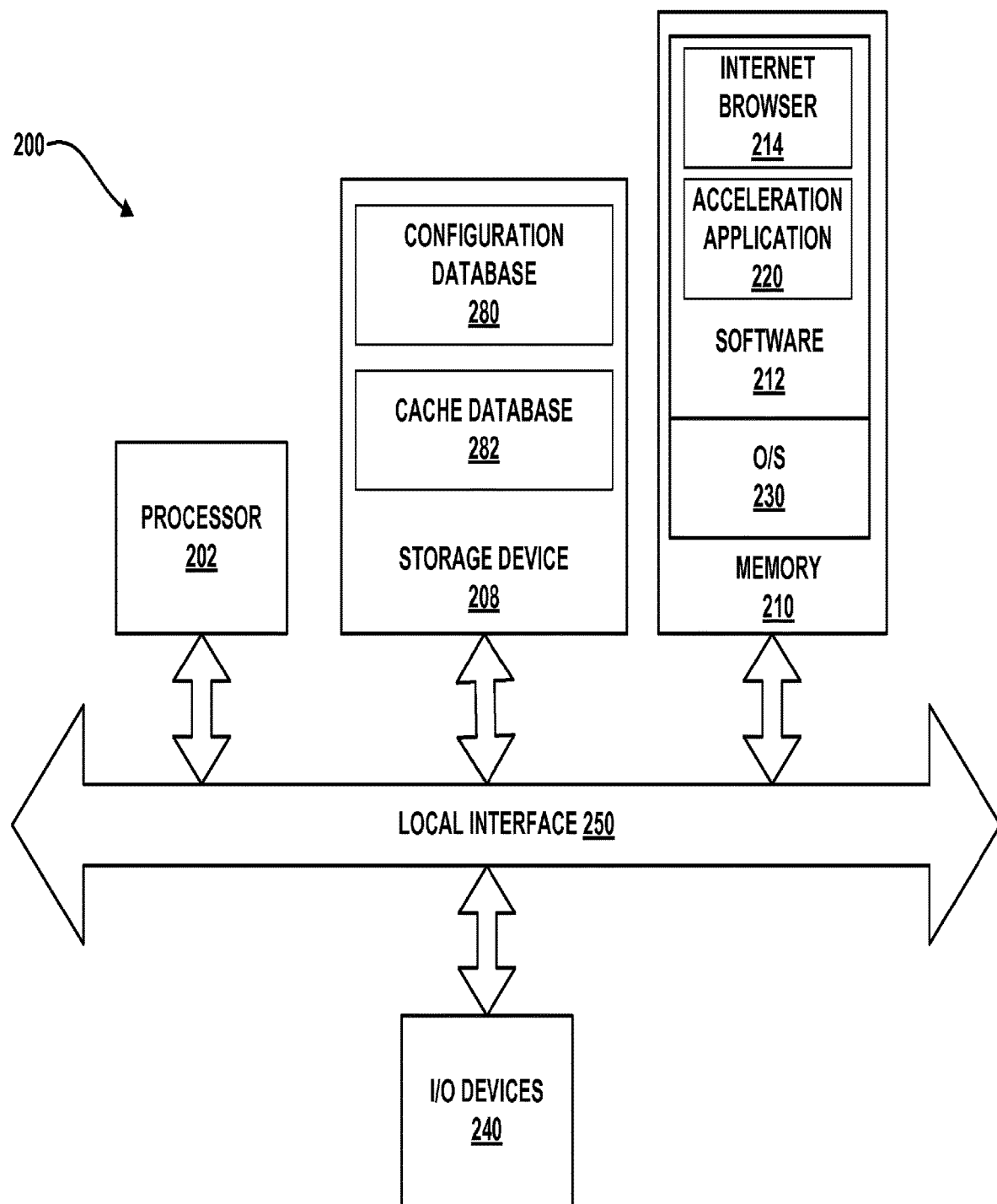
FIG. 4 is a schematic diagram further illustrating a communication device of the communication network of FIG. 3.

Prior to describing functionality performed within a communication network 100, the following further describes a communication device 200, in accordance with a first exemplary embodiment of the invention. FIG. 4 is a schematic diagram further illustrating a communication device 200 of the communication network 100, which contains general components of a computer. As previously mentioned, it should be noted that the communication device 200 of FIG. 4 may serve as a client, agent, or peer.

Generally, in terms of hardware architecture, as shown in FIG. 4, the communication device 200 includes a processor 202, memory 210, at least one storage device 208, and one or more input and/or output (I/O) devices 240 (or peripherals) that are communicatively coupled via a local interface 250. The local interface 250 can be, for example but not limited to, one or more buses or other wired or wireless connections, as is known in the art. The local interface 250 may have additional elements, which are omitted for simplicity, such as controllers, buffers (caches), drivers, repeaters, and receivers, to enable communications. Further, the local interface 250 may include address, control, and/or data connections to enable appropriate communications among the aforementioned components.

The processor 202 is a hardware device for executing software, particularly that stored in the memory 210. The processor 52 can be any custom made or commercially available processor, a central processing unit (CPU), an auxiliary processor among several processors associated with the communication device 200, a semiconductor based microprocessor (in the form of a microchip or chip set), a macroprocessor, or generally any device for executing software instructions.

Figure 5:
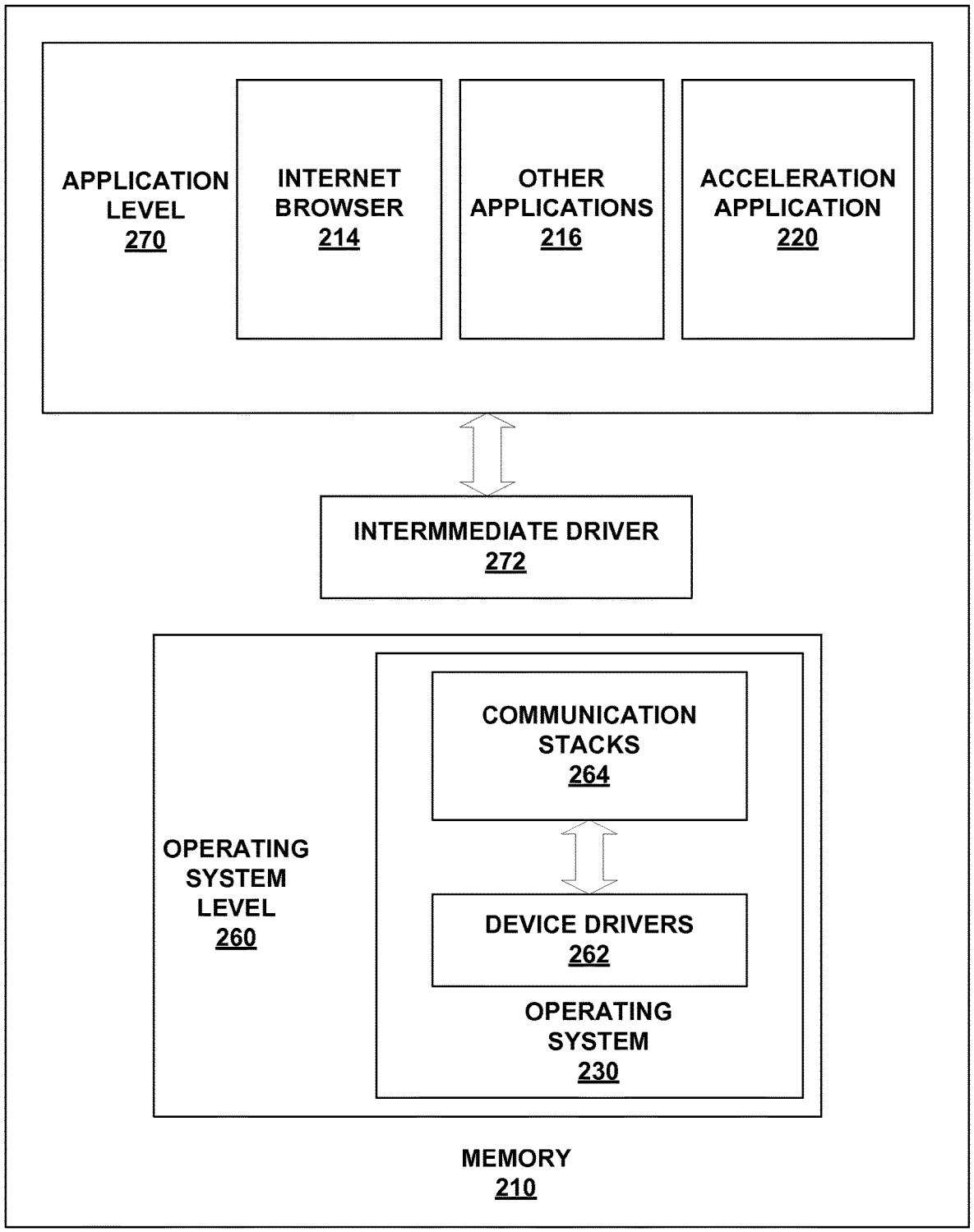
FIG. 5 is a schematic diagram further illustrating the memory of FIG. 4.

The memory 210, which is further illustrated and described by the description of FIG. 5, can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, and/or other types of storage media. Note that the memory 210 can have a distributed architecture, where various components are situated remote from one another, but can be accessed by the processor 202.

The software 212 located within the memory 210 may include one or more separate programs, each of which contains an ordered listing of executable instructions for implementing logical functions of the communication device 200, as described below. In the example of FIG. 4, the software 212 in the memory 210 at least contains an acceleration application 220 and an Internet browser 214. In addition, the memory 210 may contain an operating system (O/S) 230. The operating system 230 essentially controls the execution of computer programs and provides scheduling, input-output control, file and data management, memory management, and communication control and related services. It should be noted that, in addition to the acceleration application 220, Internet browser 214, and operating system 230, the memory 210 may contain other software applications.

While the present description refers to a request from the client originating from an Internet browser, the present invention is not limited to requests originating from Internet browsers. Instead, a request may originate from an email program or any other program that would be used to request data that is stored on a Web server, or other server holding data that is requested by the client device.

Functionality of the communication device 200 may be provided by a source program, executable program (object code), script, or any other entity containing a set of instructions to be performed. When a source program, then the program needs to be translated via a compiler, assembler, interpreter, or the like, which may or may not be included within the memory 210, so as to operate properly in connection with the operating system 230. Furthermore, functionality of the communication device 200 can be written as (a) an object oriented programming language, which has classes of data and methods, or (b) a procedure programming language, which has routines, subroutines, and/or functions.

The I/O devices 240 may include input devices, for example but not limited to, a keyboard, mouse, scanner, microphone, etc. Furthermore, the I/O devices 240 may also include output devices, for example but not limited to, a printer, display, etc. Finally, the I/O devices 240 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the communication device 200 is in operation, the processor 202 is configured to execute the software 212 stored within the memory 210, to communicate data to and from the memory 210, and to generally control operations of the communication device 200 pursuant to the software 212. The software 212 and the O/S 230, in whole or in part, but typically the latter, are read by the processor 202, perhaps buffered within the processor 202, and then executed.

When functionality of the communication device 200 is implemented in software, as is shown in FIG. 4, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality of the communication device 200 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the functionality of the communication device 200 is implemented in hardware, the functionality can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

The at least one storage device 208 of the communication device 200 may be one of many different categories of storage device. As is described in more detail herein, the storage device 208 may include a configuration database 280 and a cache database 282. Alternatively, the configuration database 280 and cache database 282 may be located on different storage devices that are in communication with the communication device 200. The description that follows assumes that the configuration database 280 and cache database 282 are located on the same storage device, however, it should be noted that the present invention is not intended to be limited to this configuration.

The configuration database 280 stores configuration data that is common to all elements of the communication network 100 and is used to provide set up and synchronization information to different modules of the acceleration application 220 stored within the memory 210, as is described in further detail herein. The cache database 282 stores responses to HTTP requests that the communication device 200 has dispatched, either for its own consumption or on behalf of other elements of the communication network 100. As is explained in additional detail herein, the responses to HTTP requests are stored within the cache database 282 for future use by this communication device 200, or for other communication devices within the communication network 100 that need to retrieve this information and will use this communication device as either a peer or an agent.

In addition to the abovementioned, as is explained in further detail herein, the cache database 282 has stored therein a list of URLs that the communication device is aware of (i.e., has seen requests for). For each URL, the cache database 282 has stored therein the URL itself, HTTP headers returned by the Web Server for this URL, when the last time was that the contents of this URL was loaded directly from the Web Server, when the contents of the URL had last changed on the Web Server, as well as a list of chunks that contain the contents of this URL, and the chunks of data themselves. Chunks in the present description are defined as equally sized pieces of data that together form the whole content of the URL. It should be noted that while the present description provides for chunks being equally sized pieces of data, in accordance with an alternative embodiment of the invention, the chunks may instead be of different size.

FIG. 5 is a schematic diagram further illustrating the memory 210 of FIG. 4. As shown by FIG. 5, the memory 210 may be separated into two basic levels, namely, an operating system level 260 and an application level 270. The operating system level 260 contains the operating system 230, wherein the operating system 230 further contains at least one device driver 262 and at least one communication stack 264. The device drivers 262 are software modules that are responsible for the basic operating commands for various hardware devices of the communication device 200, such as the processor 202, the storage device 208 and the I/O devices 240. In addition, the communication stacks 264 provide applications of the communication device 200 with a means of communicating within the network 100 by implementing various standard communication protocols.

The application level 270 includes any application that is running on the communication device 200. As a result, the application level 270 includes the Internet browser 214, which is used to view information that is located on remote Web servers, the acceleration application 220, as described in more detail below, and any other applications 216 stored on the communication device 200.

As is explained in additional detail below, the acceleration application 220 intercepts the requests being made by applications of the communication device (client) that use the Internet, in order to modify the requests and route the requests through the communication network. There are various methods that may be used to intercept such requests. One such method is to create an intermediate driver 272, which is also located within the memory 210, that attaches itself to all communication applications, intercepts outgoing requests of the communication applications of the communication device 200, such as the Internet browser 214, and routes the requests to the acceleration application 220. Once the acceleration application 220 modifies the requests, routes the requests to other system elements on the communication network 100, and receives replies from other system elements of the communication network 100, the acceleration application 220 returns the replies to the intermediate driver 272, which provides the replies back to the requesting communication application.

Figure 6:
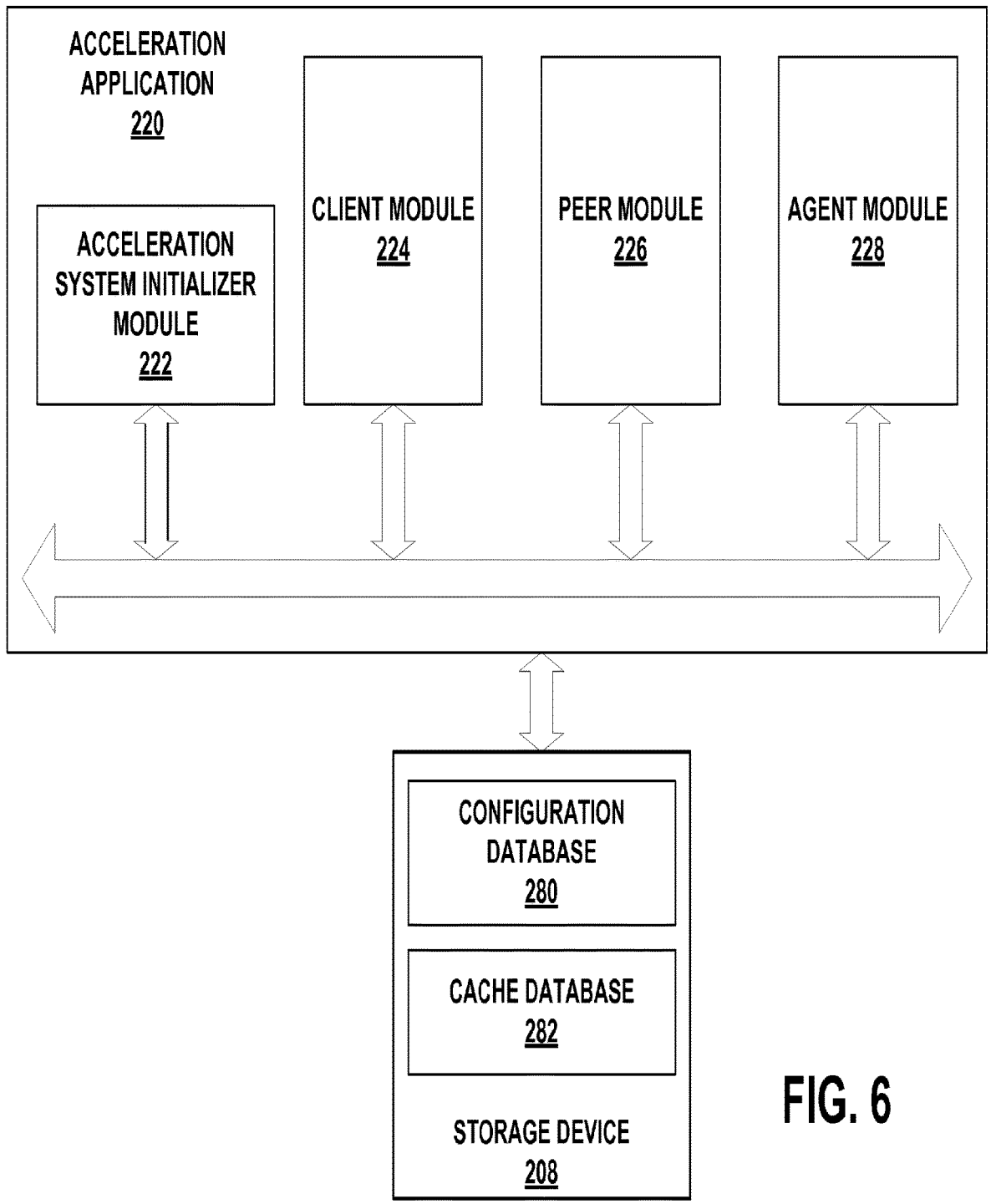
FIG. 6 is a schematic diagram further illustrating elements of the acceleration application of FIG. 5, as well as communication paths of the acceleration application.

FIG. 6 is a schematic diagram further illustrating elements of the acceleration application 220, as well as communication paths of the acceleration application 220. The acceleration application 220 contains an acceleration system initializer module 222, which is called when the acceleration application 220 is started. The acceleration system initializer module 222 is capable of initializing all elements of the communication device 200 The acceleration application 220 also contains three separate modules that run in parallel, namely, a client module 224, a peer module 226, and an agent module 228, each of which comes into play according to the specific role that the communication device 200 is partaking in the communication network 100 at a given time. The role of each module is further described herein.

The client module 224 provides functionality required when the communication device 200 is requesting information from the Web server 152, such as, for example, but not limited to, Web pages, data, video, or audio. The client module 224 causes the communication device 200 having the client module 224 therein to intercept the information request and pass the information request on to other elements of the communication network 100, such as, servers, agents or peers. This process is further described in detail herein.

The peer module 226 provides functionality required by the communication device 200 when answering other clients within the communication network 100 and providing the other clients with information that they request, which this communication device 200, having this peer module 226 therein, has already downloaded at a separate time. This process is further described in detail herein.

The agent module 228 provides functionality required when other communication devices of the communication network 100 acting as clients query this communication device 200, having this agent module 228 therein, as an agent, to obtain a list of peers within the communication network 100 that contain requested information. This process is further described in detail herein.

The acceleration application 220 interacts with both the configuration database 280 and the cache database 282 of the storage device 208. As previously mentioned herein, the configuration database 280 stores configuration data that may be common to all communication devices of the communication network 100 and is used to provide setup and synchronization information to different modules 222, 224, 226, 228 of the acceleration application 220 stored within the memory 210.

The cache database 282 stores responses to information requests, such as, for example, HTTP requests, that the communication device 200 has dispatched, either for its own consumption or on behalf of other elements of the communication network 100. The responses to HTTP requests are stored within the cache database 282 for future use by this communication device 200, or for other communication devices within the communication network 100 that need to retrieve this same information and will use this communication device 200 as either a peer or an agent. This process is described in detail herein.

Information stored within the cache database 282 may include any information associated with a request sent by the client. As an example, such information may include, metadata and actual requested data. For example, for an HTTP request for a video, the metadata may include the version of the Web server answering the request from the client and the data would be the requested video itself. In a situation where there is no more room for storage in the cache database, the software of the associated communication device may cause the communication device to erase previous data stored in order to clear room for the new data to store in the cache database. As an example, such previous data may include data that is most likely not to be used again. Such data may be old data or data that is known to no longer be valid. The communication device may choose to erase the least relevant data, according to any of several methods that are well known in the art.

Figure 7:
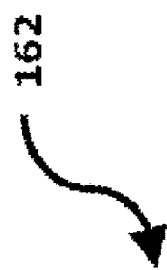
FIG. 7 is a chart further illustrating two of the main databases utilized within the communication network.

FIG. 7 is a chart further illustrating two of the main databases utilized within the communication network 100, namely, the acceleration server database 164 and the cache database 282. As previously mentioned, the acceleration server database 164 stores IP addresses of communication devices located within the communication network 100, which have acceleration software stored therein. Specifically, the acceleration server database 164 contains stored therein a list of communication devices having acceleration software stored therein that are currently online within the communication network 100. The acceleration server assigns a list of IP addresses to each communication device functioning as an agent. Each communication device will be the agent for any Web servers whose IP address is in the range 'owned' by that communication device. As an example, when a first ever communication device goes online, namely, the first communication device as described herein having the acceleration application 220 therein, the acceleration server assigns all IP addresses in the world to this communication device, and this communication device will be the agent for any Web server. When a second communication device goes online it will share the IP address list with the first communication device, so that each of the communication devices will be responsible for a different part of the world wide web servers.

The cache database 282 of the communication device 200 has stored therein a list of URLs 286 of which the communication device 200 is aware. The communication device 200 becomes aware of a URL each time that the communication device 200 receives a request for information located at a specific URL. As shown by FIG. 7, for each URL 288 within the list of URLs 286, the cache database 282 stores: the URL itself 290; HTTP headers 292 returned by the Web Server 152 for this URL; when the last time 294 was that the contents of this URL were loaded directly from the Web Server 152; when the contents of the URL last changed 296 on the Web Server 152; and a list of chunks 298 that contain the contents of this URL, and the content of the chunk. As previously mentioned, chunks, in the present description, are defined as equally sized pieces of data that together form the entire content of the URL, namely, the entire content whose location is described by the URL. As a non-limiting example, a chunk size of, for example, 16 KB can be used, so that any HTTP response will be split up into chunks of 16 KB. In accordance with an alternative embodiment of the invention, if the last chunk of the response is not large enough to fill the designated chunk size, such as 16 KB for the present example, the remaining portion of the chunk will be left empty.

For each such chunk 300, the cache database 282 includes the checksum of the chunk 302, the data of the chunk 304 itself, and a list of peers 306 that most likely have the data for this chunk. As is described in additional detail herein, the data for the chunk may be used by other clients within the communication network 100 when other communication devices of the communication network 100 serve as peers to the clients, from which to download the chunk data.

For each chunk, a checksum is calculated and stored along side of the chunk itself. The checksum may be calculated in any of numerous ways known to those in the art. The purpose of having the checksum is to be able to identify data uniquely, whereas the checksum is the "key" to the data, where the data is the chunk. As an example, a client may want to load the contents of a URL, resulting in the agent that is servicing this request sending the checksums of the chunks to the client, along with the peers that store these chunks. It is to be noted that there could be a different peer for every different chunk. The client then communicates with each such peer, and provides the checksum of the chunk that it would like the peer to transmit back to the client. The peer looks up the checksum (the key) in its cache database, and provides back the chunk (data) that corresponds to this checksum (the key). As shown by FIG. 7, for each peer 308 within the list of peers 306, the cache database 282 includes the peer IP address 310, as well as the connection status 312 of the peer, which represents whether the peer 308 is online or not.

In accordance with one embodiment of the invention, the cache database 282 may be indexed by URL and by Checksum. Having the cache database indexed in this manner is beneficial due to the following reason. When the agent is using the cache database, the agent receives a request from a client for the URL that the client is looking for. In such a case the agent needs the cache database to be indexed by the URL, to assist in finding a list of corresponding peers that have the chunks of this URL. When the peers are using this cache database, the peers obtain a request from the client for a particular checksum, and the peers need the database to be indexed by the checksum so that they can quickly find the correct chunk. Of course, as would be understood by one having ordinary skill in the art, the cache database may instead be indexed in any other manner.

Figure 8:
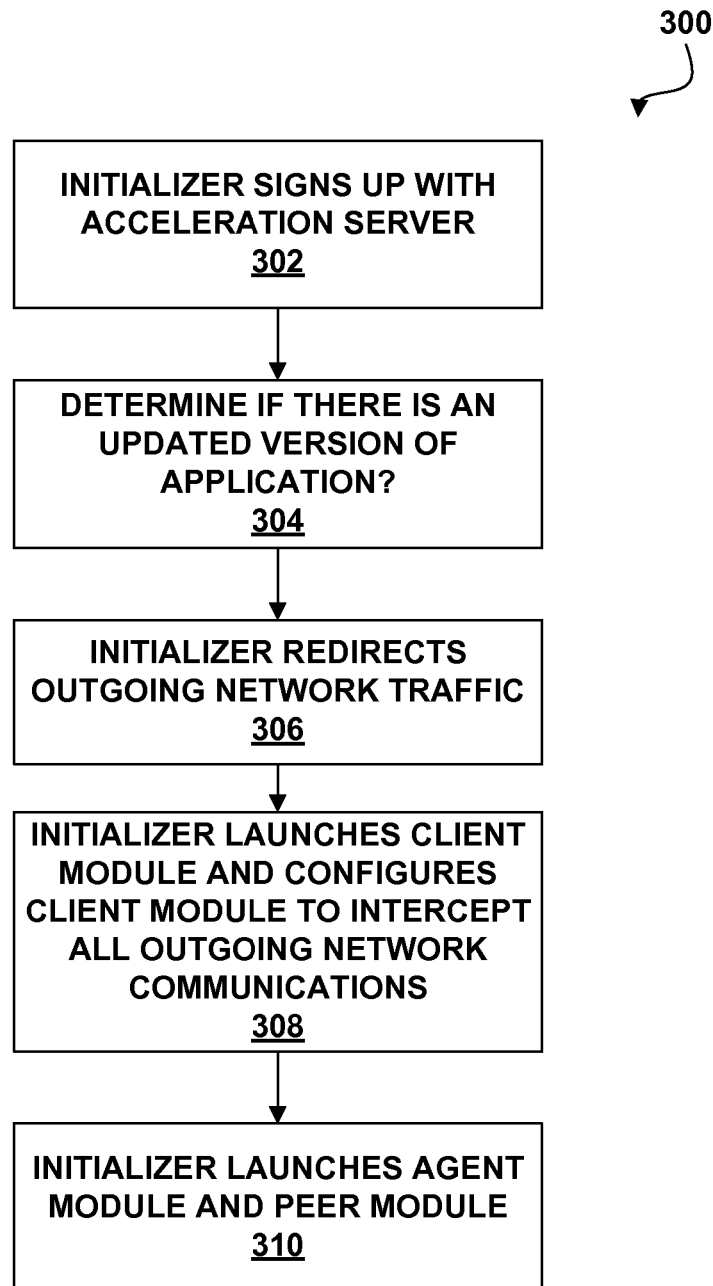
FIG. 8 is a flowchart illustrating operation of the acceleration system initializer module.

Having described components of the communication network 100, the following further describes how such components interact and individually function. FIG. 8 is a flowchart 300 illustrating operation of the acceleration system initializer module 222 (hereafter referred to as the initializer 222 for purposes of brevity). It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The initializer 222 is the first element of the communication device 200 to operate as the communication device 200 starts up (block 302). As the initializer 222 starts, it first communicates with the acceleration server 162 to sign up with the acceleration server 162. This is performed by providing the acceleration server 162 with the hostname, and all IP addresses and media access control (MAC) addresses of the interfaces on the communication device 200 having the initializer 222 thereon.

In accordance with an alternative embodiment of the invention, as shown by block 304, the initializer 222 checks with the acceleration server 162 whether a more updated version of the acceleration application software is available. This may be performed by any one of many known methods, such as, but not limited to, by providing the version number of the acceleration application software to the acceleration server 162. The message received back from the acceleration server 162 indicates whether there is a newer version of the acceleration application software or not. If a newer version of the acceleration application software exists, the initializer 222 downloads the latest version of the acceleration application software from the acceleration server 162, or from a different location, and installs the latest version on the communication device 200. In addition to the abovementioned, the initializer 222 may also schedule additional version checks for every set period of time thereafter. As an example, the initializer 222 may check for system updates every two days.

As shown by block 306, the initializer 222 then redirects outgoing network traffic from the communication device 200 to flow through the acceleration application 162. As previously mentioned, one way to redirect the outgoing network traffic is to insert an intermediate driver 212 that intercepts and redirects the traffic. It should be noted that there are many other ways to implement this redirection, which are well known to those having ordinary skill in the art.

As shown by block 308, the initializer 222 then launches the client module 224 of the communication device 200, and configures the client module 224 of the communication device 200 to intercept to all outgoing network communications of the communication device 200 and route the outgoing network communications to the client module 224, from the intermediate driver 272 or other routing method implemented. This is performed so that the client module 224 is able to receive all network traffic coming from the network applications, modify the network traffic if necessary, and re-route the traffic. As is known by those having ordinary skill in the art, in order to re-route the traffic, the traffic needs to be modified, as an example, to change the destination of requests.

As shown by block 310, the initializer 222 then launches the agent module 228 and the peer module 226 to run on the communication device 200. The agent module 228 and peer module 226 listen on pre-determined ports of the communication device 200, so that incoming network traffic on these ports gets routed to the agent module 228 and peer module 226. As is explained in further detail herein, the abovementioned enables the communication device 200 to function as an agent and as a peer for other communication devices within the communication network 100, as needed.

Figure 9:
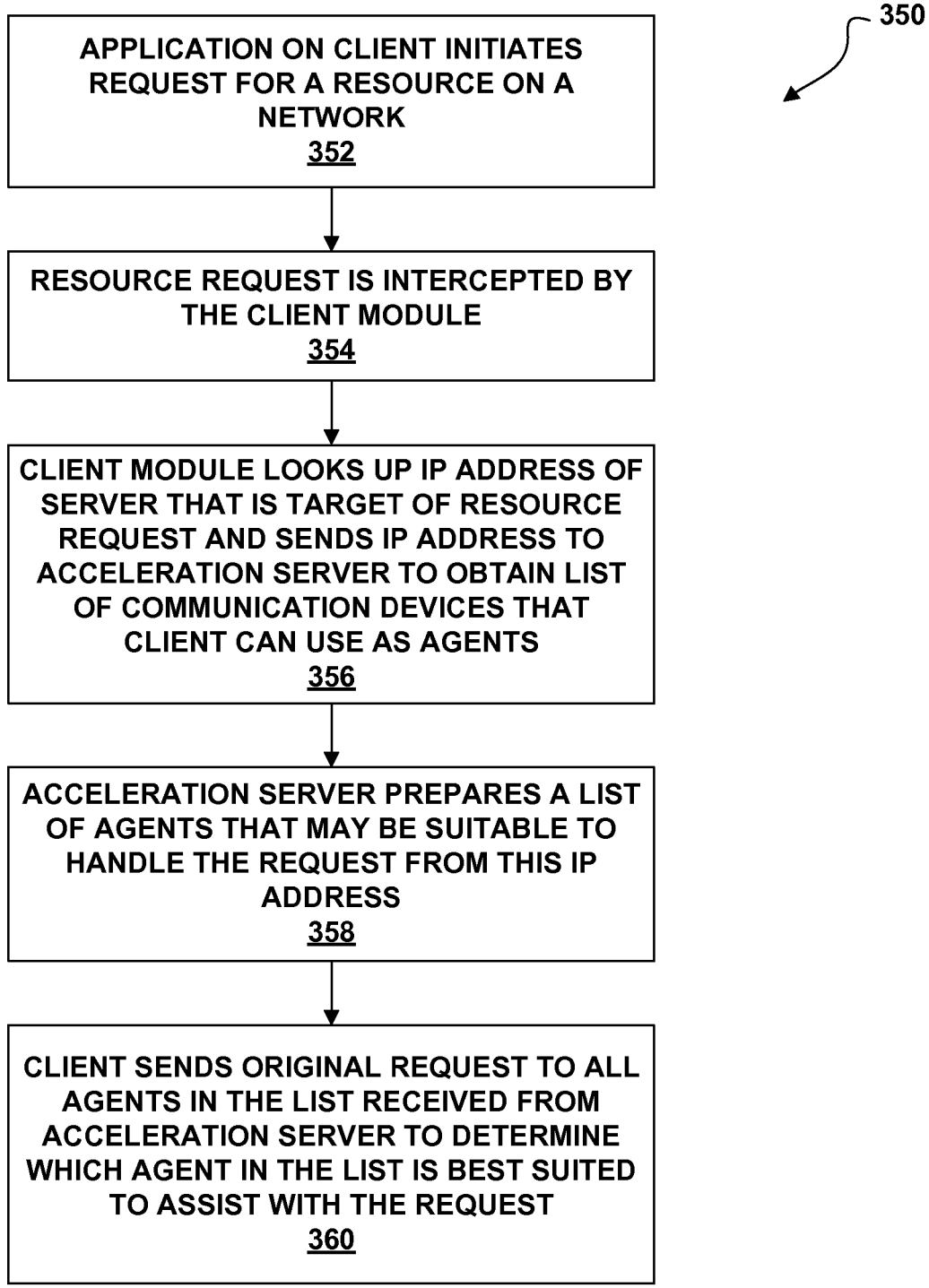
FIG. 9 is a flowchart further illustrating communication between different elements of the communication network.

FIG. 9 is a flowchart 350 further illustrating communication between different elements of the communication network 100, in accordance with the present system and method for providing faster and more efficient data communication.

As shown by block 352, an application running on the client 200 initiates a request for a resource on a network. Such a request may be, for example, "GET http://www.aol-.com/index.html HTTP/1.1". The request may come from an Internet browser 214 located on the client 200, where the Internet browser 214 is loading a page from the Internet, an application that wants to download information from the Internet, fetch or send email, or any other network communication request.

Through the intermediate driver 272, or other such mechanism as may be implemented that is re-routing the communication to the client module 224 of the client 200, the resource request is intercepted by the client module 224 that is running on the client 200 (block 354). The client module 224 then looks up the IP address of the server 152 that is the target of the resource request (e.g., the IP address of the Web server that is the host of www.aol.com in the example above), and sends this IP address to the acceleration server 162 (block 356) in order to obtain a list of communication devices that the client 200 can use as agents (hereafter referred to as agents). It should be noted that the process of performing an IP lookup for a server is known by one having ordinary skill in the art, and therefore is not described further herein.

In response to receiving the IP address of the server 152, the acceleration server 162 prepares a list of agents that may be suitable to handle the request from this IP address (block 358). The size of the list can differ based on implementation. For exemplary purposes, the following provides an example where a list of five agents is prepared by the acceleration server 162. The list of agents is created by the acceleration server 162 by finding the communication devices of the communication network 100 that are currently online, and whose IP address is numerically close to the IP of the destination Web server 152. A further description of the abovementioned process is described here in.

As shown by block 360, the client module 224 then sends the original request (e.g., "GET http://www.aol.com/index.html HTTP/1.1") to all the agents in the list received from the acceleration server 162 in order to find out which of the agents in the list is best suited to be the one agent that will assist with this request.

It should be noted that, in accordance with an alternative embodiment of the invention, the communication device 200 may be connected to a device that is actually requesting data. In such an alternative embodiment, the communication device would be a modular device connected to a requesting device, where the requesting device, such as, for example, a personal data assistant (PDA) or other device, would request data, and the communication device connected thereto, either through a physical connection, wireless connection, or any other connection, would receive the data request and function as described herein. In addition, as previously mentioned, it should be noted that the HTTP request may be replaced by any request for resources on the Web.

Figure 10:
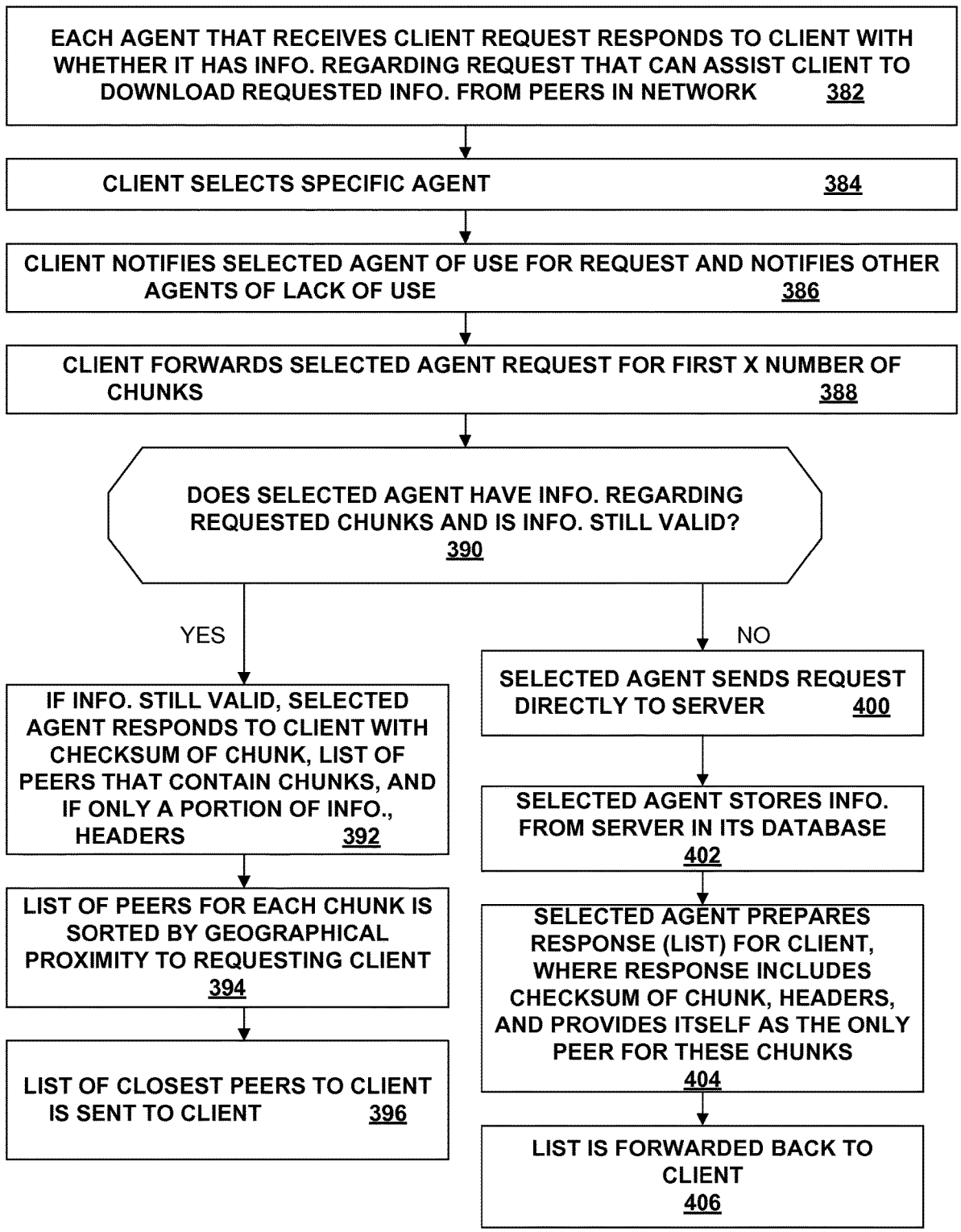
FIG. 10 is a flowchart continuing the flowchart of FIG. 9 and focused on agent response to the HTTP request.

FIG. 10 is a flowchart continuing the flowchart 380 of FIG. 9 and focused on agent response to the request. As shown by block 382, upon receiving the request from the client 200, each agent that received the request from the client responds to the client 200 with whether it has information regarding the request, which can help the client to download the requested information from peers in the network. Specifically, each agent responds with whether the agent has seen a previous request for this resource that has been fulfilled. In such a case, the agent may then provide the client with the list of peers and checksums of the chunks that each of them have.

As shown by block 384, the client then decides which of the agents in the list to use as its agent for this particular information request. To determine which agent in the list to use as its agent for the particular information request, the client may consider multiple factors, such as, for example, factoring the speed of the reply by each agent and whether that agent does or does not have the information required. There are multiple ways to implement this agent selection, one practical way being to start a timer of a small window of time, such as, for example, 5 ms, after receiving the first response from the agents, and after the small window, choosing from the list of agents that responded, the agent that has the information about the request, or in the case that none of the agents responded, to choose the first agent from the list received from the acceleration server 162.

As shown by block 386, after selecting an agent, the client notifies the selected agent that it is going to use it for this request, and notifies the other agents that they will not be used for this request. The client then sends the selected agent a request for the first five chunks of data of the original information request (block 388). By specifying to the selected agent the requested chunks by their order in the full response, the client receives the peer list and checksums of the requested chunks from the selected agent. As an example, for the first five chunks the client will ask the selected agent for chunks one through five, and for the fourth batch of five chunks the client will ask the agent for chunks sixteen through twenty. As previously mentioned, additional or fewer chunks may be requested at a single time.

As shown by block 390, after receiving the request from the client, the selected agent determines whether it has information regarding the requested chunks of data by looking up the request in its cache database and determining if the selected agent has stored therein information regarding peers of the communication network that have stored the requested data of the request, or whether the selected agent itself has the requested data of the request stored in its memory. In addition to determining if the selected agent contains an entry for this request in its database, the selected agent may also determine if this information is still valid. Specifically, the selected agent determines whether the data that is stored within the memory of the selected agent or the memory of the peers, still mirrors the information that would have been received from the server itself for this request. A further description of the process utilized by the selected agent to determine if the information is still valid, is described in detail herein.

As shown by block 392, if the information (requested data of the request) exists and is still valid, then the agent prepares a response to the client, which includes for each of the chunks: (i) the checksum of the chunk; (ii) a list of peers that according to the database of the selected agent contains these chunks; and (iii) if these are the first five chunks of the information, then the selected agent also provides the specific protocol's headers that would have been received from the server, had the initial request from the client been made directly to the server.

As shown by block 394, the list of peers for each chunk is sorted by geographical proximity to the requesting client. In accordance with the present example, only the five closest peers are kept in the list for every chunk, and the rest of the peers are discarded from this list. As shown by block 396, the prepared response, namely, the list of closest peers, is sent back to the client. It should be noted that, if this were the last set of chunks to be provided for this request, then it would be beneficial to include information about this to the client.

If the selected agent discovers that it does not have information about this request, or if the selected agent discovers that the information it has is no longer valid, the selected agent needs to load the information directly from the server in order to be able to provide an answer to the requesting client. As shown by block 400, the selected agent then sends the request directly to the server. The selected agent then stores the information it receives from the server (both the headers of the request, as well as chunks of the response itself) in its database, for this particular response to the client, as well as for future use to other clients that may request this data (block 402). The selected agent then prepares a response (list) for the client, where the response includes the protocol headers (if these are the first five chunks), and the checksums of the five chunks, and provides itself as the only peer for these chunks (block 404). This list is then sent back to the client (block 406).

Figure 11:
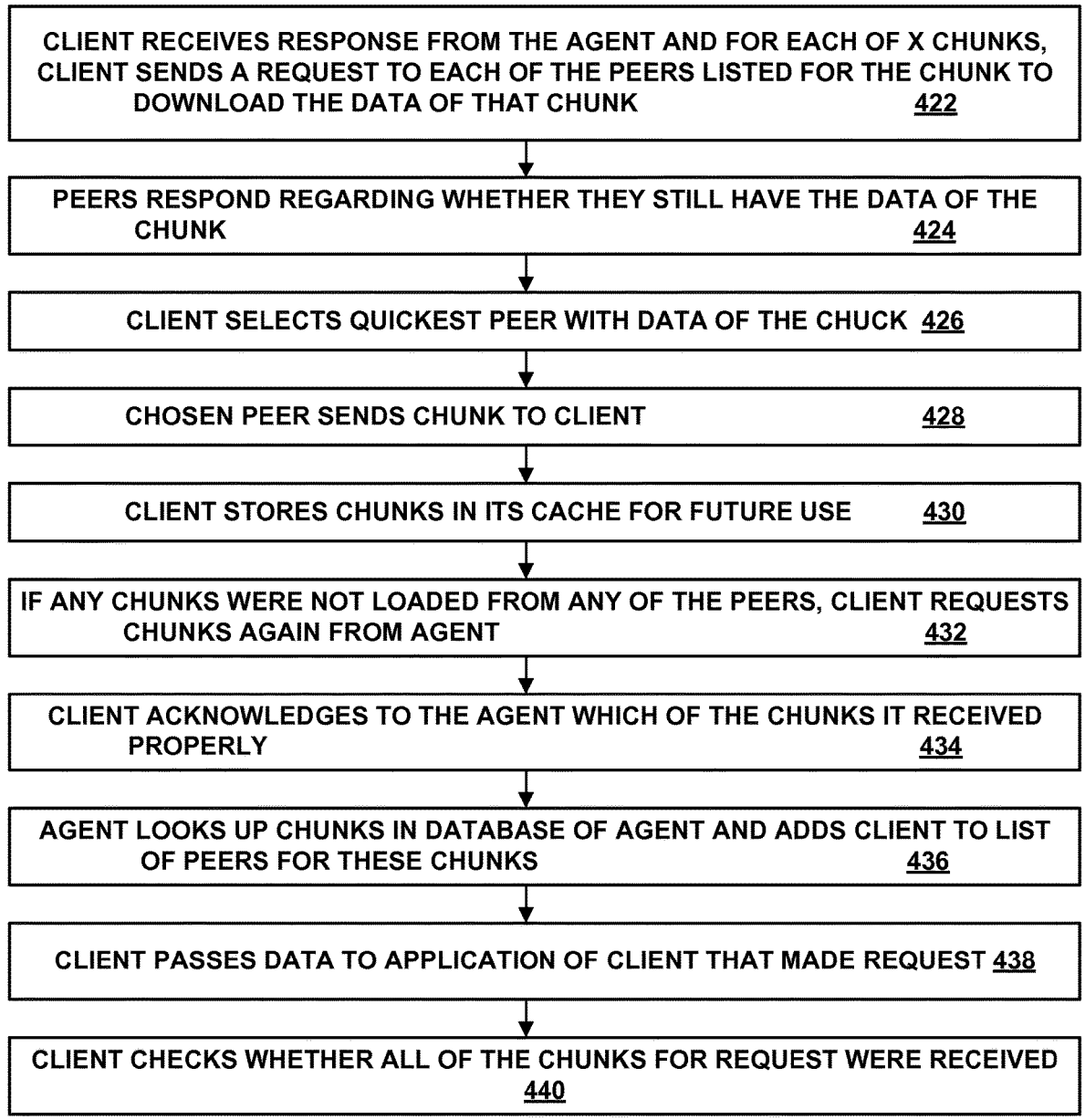
FIG. 11 is a flowchart continuing the flowchart of FIG. 10, which illustrates actions taken upon receipt of the list of peers, or single peer listing, from the agent.

FIG. 11 is a flowchart 420 continuing the flowchart of FIG. 10, which illustrates actions taken upon receipt of the list of peers, or single peer listing, from the agent. As shown by block 422, the client receives the response from the agent (including the list of chunks and their corresponding data, including peers and other information previously mentioned) and, for each of the five chunks, the client sends a request to each of the peers listed for the chunk to download the chunk. The chunk request that the client sends to each of the peers is the checksum of the data that the client seeks to receive, which is the key (identifier) of the chunk.

As shown by block 424, the peers then respond regarding whether they still have the data of the chunk. As an example, some of the peers may not currently be online, some may be online but may have discarded the relevant information, and some may still have the relevant information, namely, the chunk. As shown by block 426, the client then selects the quickest peer that responds with a positive answer regarding the requested information, the client lets that peer know that it is chosen to provide the client with the chunk, and the client notifies the other peers that they are not chosen.

As shown by block 428, the chosen peer then sends the chunk to the client. It should be noted that if no peers answer the request of the client, the client goes back to the agent noting that the peers were all negative, and the agent either provides a list of 5 other agents, if they exist, or the agent goes on to download the information directly from the Web server as happens in the case where no peers exist as described above.

The client then stores the chunks in its cache for future use (block 430), when the client may need to provide the chunks to a requesting communication device when acting as a peer for another client that is looking for the same information. As shown by block 432, if some of the chunks were not loaded from any of the peers, the client requests the chunks again from the agent in a next round of requests, flagging these chunks as chunks that were not loadable from the client list of peers. In this situation, the agent will load the data directly from the server and provide it back to the client.

The client then acknowledges to the agent which of the chunks it received properly (block 434). The agent then looks up these chunks in the database of the agent, and adds the client to the list of peers for these chunks, specifically, since this client is now storing these chunks, and can provide these chunks to other clients that turn to it as a peer (block 436).

As shown by block 438, the client then passes the data on to the Web browser or other application of the client that made the original request, for it to use as it had originally intended. The client then checks whether all of the chunks for this request were received (block 440), by checking the flag set by the agent. Specifically, when the agent is providing the list of the last 5 chunks, the agent includes that information as part of its reply to the client, which is referred to herein as a flag. This information is what enables the client to know that all information has been received for a particular resource request.

If the last received chunks were not the last chunks for this request, the processing flow of the client continues by returning to the functionality of block 384 of FIG. 10, but instead sending the chosen agent a request for the next five chunks of data of the original information request. Alternatively, if all chunks for this request were received, the request is complete, and the flow starts again at block 352 of FIG. 9.

Figure 12:
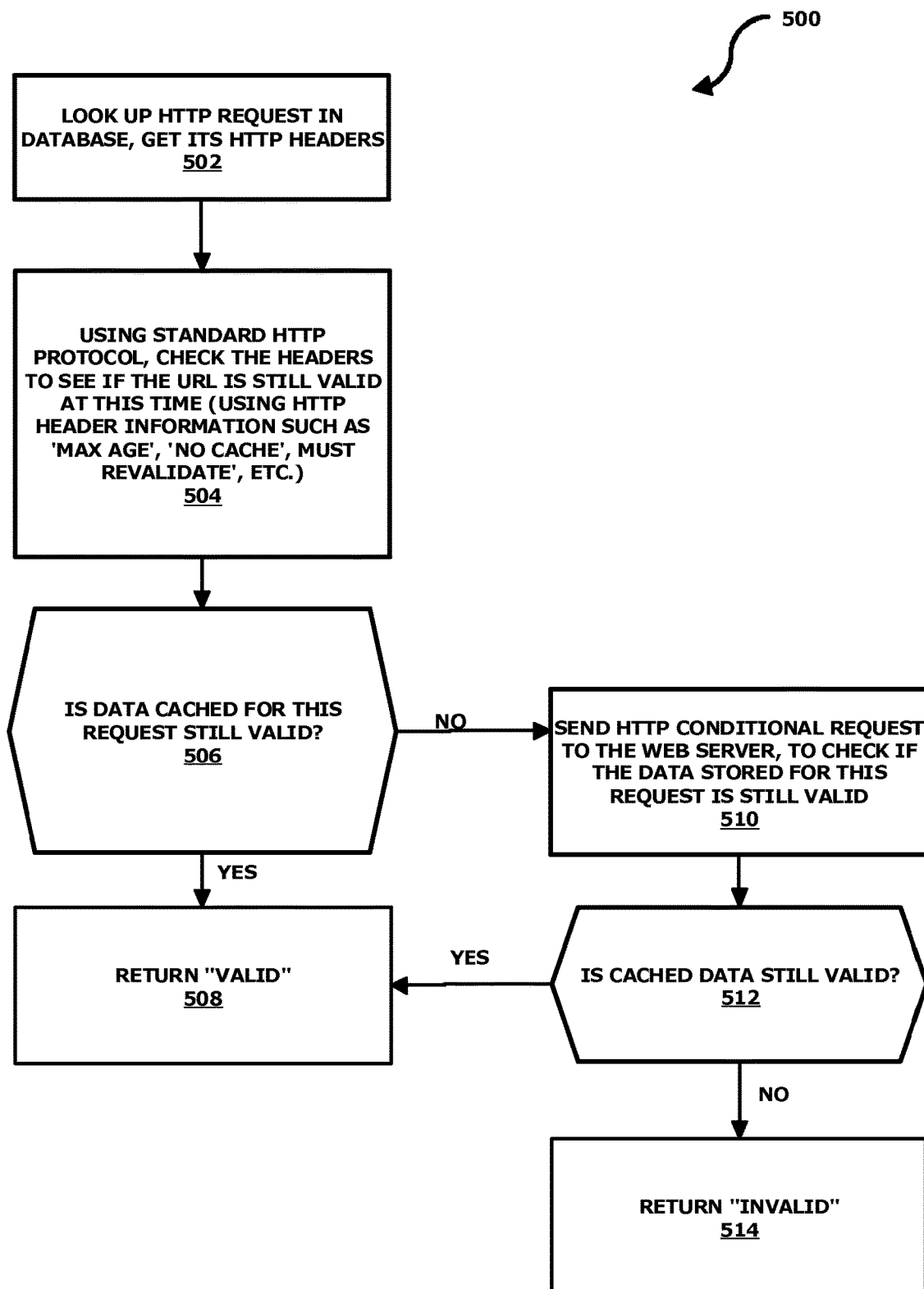
FIG. 12 is a flowchart illustrating steps taken by an agent, client, or peer to determine whether a certain HTTP request is still valid.

FIG. 12 is a flowchart 500 illustrating steps taken by an agent, client, or peer to determine whether a certain HTTP request is still valid. Specifically, the following provides an example of how the agent, client, or peer can determine whether particular data that is stored within the memory of the agent, or the memory of a peer or client, still mirrors the information that is currently on the Web server. As shown by block 502, the HTTP request is looked up in the cache database of the agent, client or peer that is checking the validity of the HTTP request. As an example, the HTTP protocol, defined by RFC 2616, outlines specific methods that Web servers can define within the HTTP headers signifying the validity of certain data, such as, but not limited to, by using HTTP header information such as "max age" to indicate how long this data may be cached before becoming invalid, "no cache" to indicate that the data may never be cached, and using other information.

As shown by block 504, these standard methods of validation are tested on the HTTP request information in question. As shown by block 506, a determination is made whether the requested information that is stored is valid or not. If the requested information is valid, a "VALID" response is returned (block 508). Alternatively, if the requested information is not valid, an HTTP conditional request is sent to the relevant Web server, to determine if the data stored for this request is still valid (block 510). If the data stored for this request is still valid, a "VALID" response is returned (block 508). Alternatively, if the data stored for this request is not valid, an "INVALID" response is returned (block 514). It should be noted, that the abovementioned description with regard to FIG. 12 is an explanation of how to check if HTTP information is still valid. There are similar methods of determining validity for any other protocol, which may be utilized, and which those having ordinary skill in the art would appreciate and understand.

Figure 13:
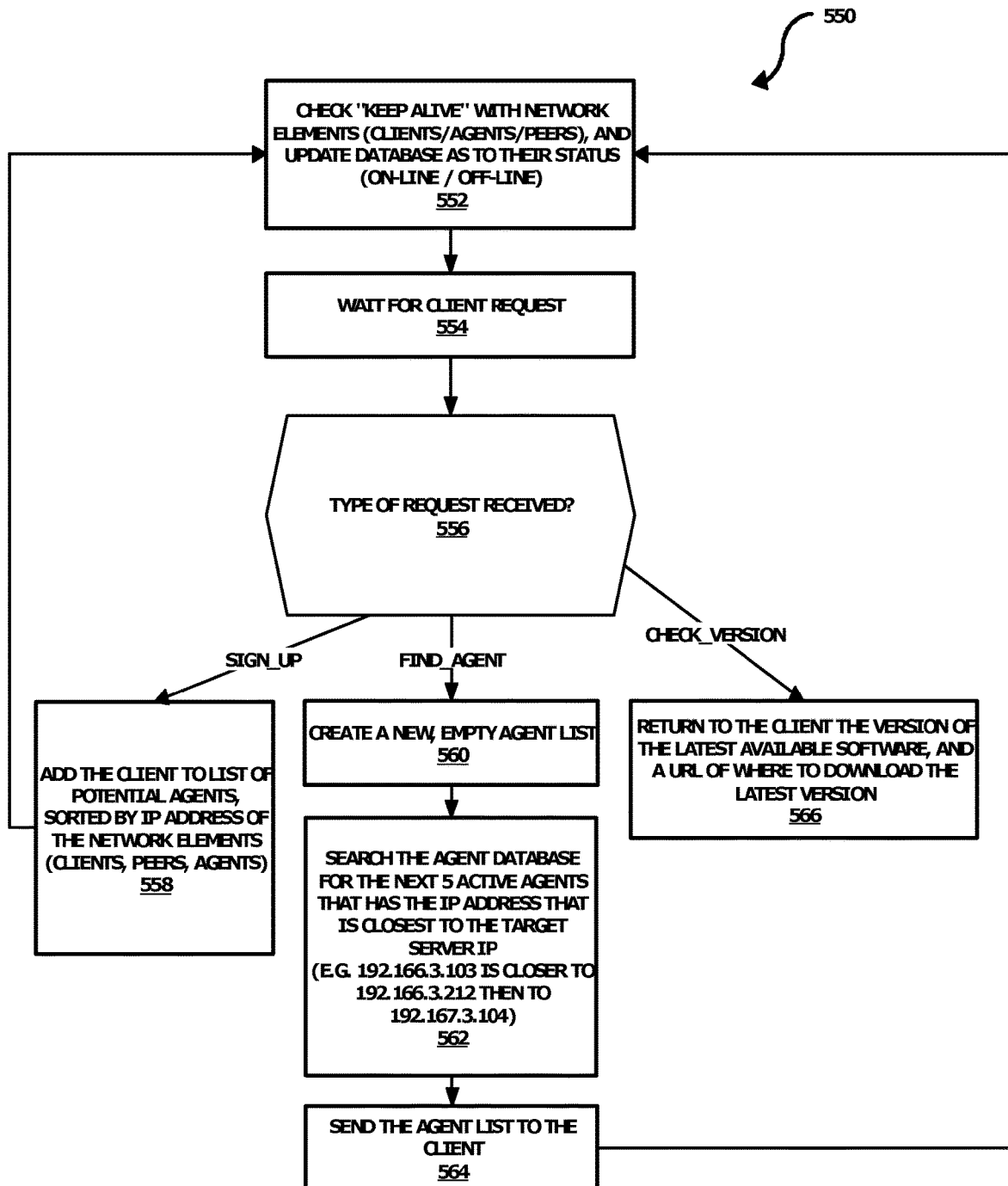
FIG. 13 is a flowchart outlining operation of the acceleration server.

FIG. 13 is a flowchart 550 outlining operation of the acceleration server, whose main responsibility in the present system and method is to provide clients with information regarding which agents serve which requests, and to keep the network elements all up to date with the latest software updates. As shown by block 552, the acceleration server sends "keep alive" signals to the network elements, and keeps track within its database as to which network elements are online. As shown by block 554, the acceleration server continues to wait for a client request and continues to determine if one is received.

Once a request is received, the acceleration server tests the type of request received (block 556). If the client request is to sign up the client within the network, an event that happens every time that the client starts running on its host machine, then that client is added to the list of agents stored on the acceleration server, sorted by the IP address of the client (block 558).

If the request is to find an agent to use for a particular request, the acceleration server creates a new agent list, which is empty (block 560). The acceleration server then searches the agent database for the next 5 active agents whose IP address is closest to the IP address of the server who is targeted in the request (block 562). In this context, 192.166.3.103 is closer to 192.166.3.212 than to 192.167.3.104. The acceleration server then sends this agent list to the client (block 564).

If instead, the request is to check the version of the latest acceleration software then the acceleration server sends that network element (client, peer or agent) the version number of the latest existing acceleration software version, and a URL from where to download the new version, for the case that the element needs to upgrade to the new version (block 566).

While the abovementioned example is focused on HTTP requests for data, as previously mentioned, other protocol requests are equally capable of being handled by the present system and method. As an example, in separate embodiments the acceleration method described may accelerate any communication protocol at any OSI layer (SMTP, DNS, UDP, ETHERNET, etc.). In the following alternative embodiment, it is illustrated how the acceleration method may accelerate TCPIP. As is known by those having ordinary skill in the art, TCPIP is a relatively low-level protocol, as opposed to HTTP, which is a high level protocol. For purposes of illustration of TCPIP communication, reference may be made to FIG. 3, wherein the Web server is a TCPIP server.

In TCPIP there are three communication commands that are of particular interest, namely, connect, write, and read. Connect is a command issued by an application in the communication device that is initiating the communication to instruct the TCPIP stack to connect to a remote communication device. The connect message includes the IP address of the communication device, and the port number to connect to. An application uses the write command to instruct the TCPIP stack to send a message (i.e., data) to a communication device to which it is connected. In addition, an application uses the read command to ask the TCPIP stack to provide the message that was sent from the remote communication device to which it is connected. A communication session typically exists of a connect, followed by a read and write on both sides.

Figure 14:
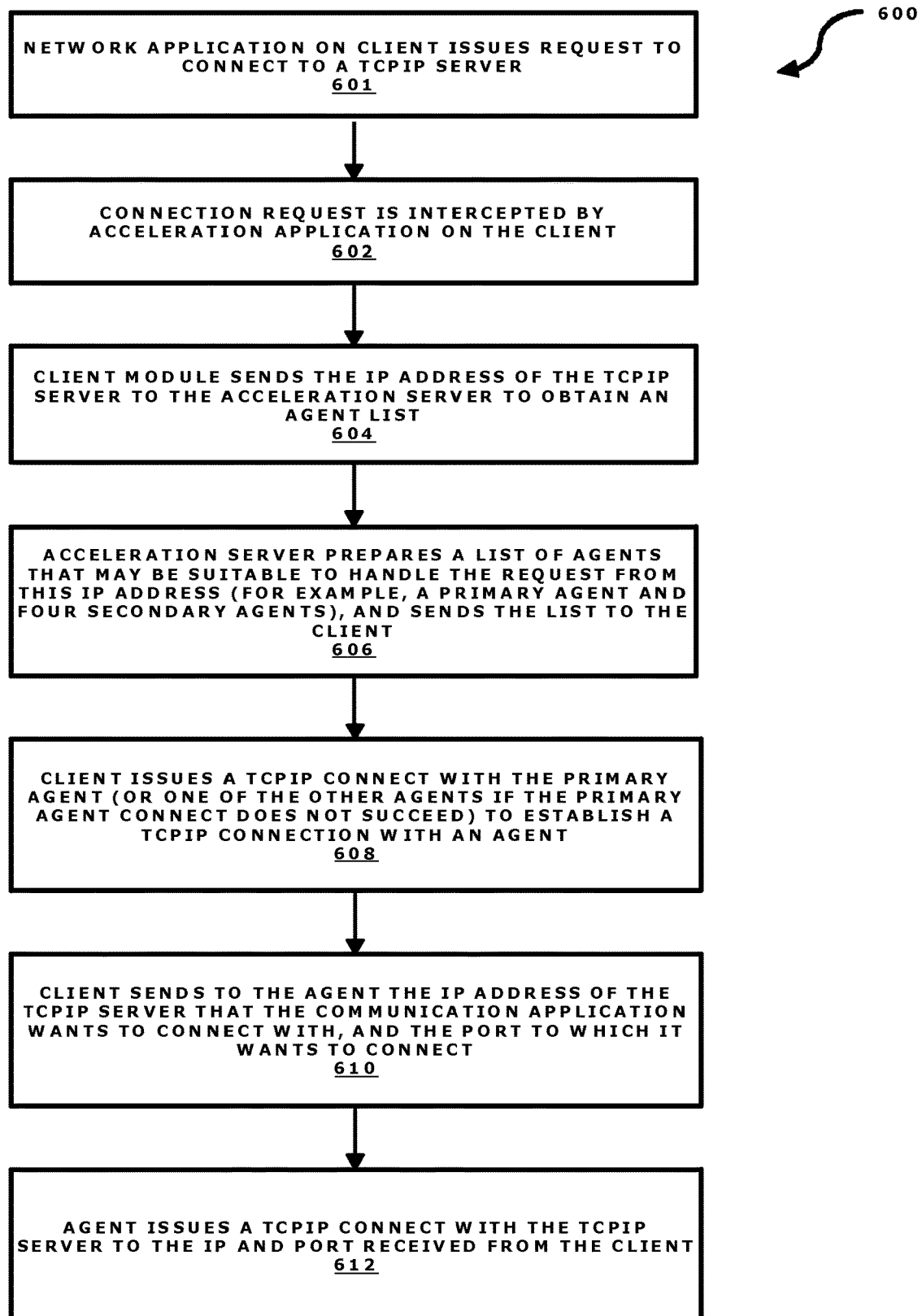
FIG. 14 is a flowchart further illustrating TCPIP acceleration in accordance with an alternative embodiment of the invention.

FIG. 14 is a flowchart 600 further illustrating TCPIP acceleration in accordance with this alternative embodiment of the invention. As shown by blocks 601 and 602 when an application of the communication device makes a request to the communications stack to connect with the TCPIP server, that communication is intercepted by the acceleration application.

To find an agent, upon receiving that connect message from the communication device application, which includes the IP address of the TCPIP server and the port to connect to, the acceleration application in the client makes a request to the acceleration server to find out who the agent for the communication with the TCPIP server is. This step is performed in a similar manner to that described with regard to the main HTTP embodiment of the invention (block 604). As shown by block 606, the server then provides the client with a list of agents, for example, a primary agent and four others.

To establish a connection, as shown by block 608, the client issues a TCPIP connect with the primary agent or one of the other agents if the primary agent does not succeed, to create a connection with the agent. The client then sends to the agent the IP address of the TCPIP server and connection port that were provided by the communication device application (block 610). As shown by block 612, that agent in turn issues a TCPIP connect to the TCPIP server to the port it received from the client, to create a connection with the agent.

Figure 15:
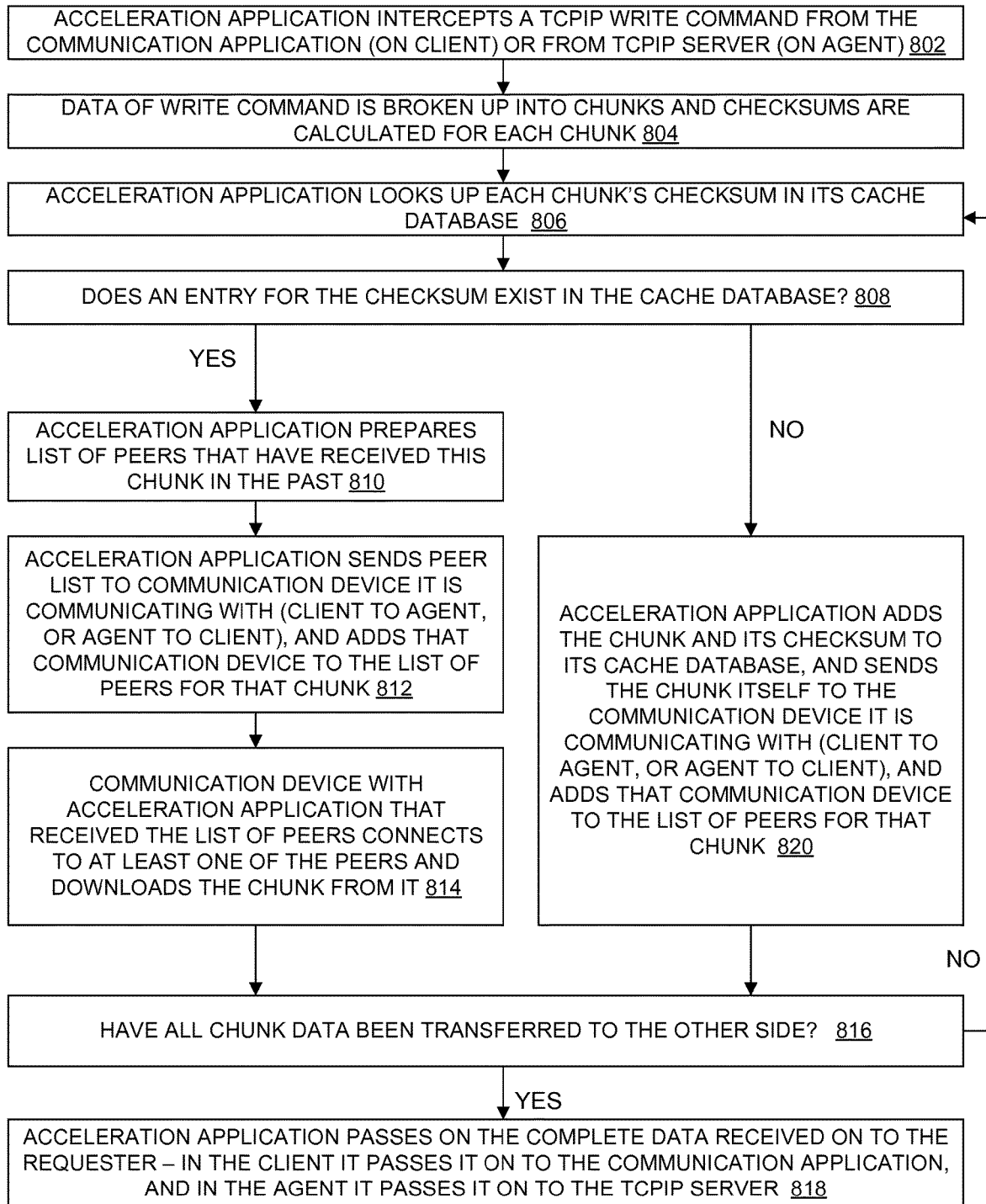
FIG. 15 is a flowchart further illustrating TCPIP acceleration in accordance with an alternative embodiment of the invention, detailing the communication between the client and the TCPIP server (read and write commands) after the connect phase has completed successfully.

FIG. 15 is a flowchart 800 further illustrating TCPIP acceleration in accordance with this alternative embodiment of the invention, detailing the communication between the client and the TCPIP server (read and write commands) after the connect phase has completed successfully.

As shown by block 802, if the network application within the client wants to send a message to the TCPIP server, the network application within the client writes the message to the TCPIP stack in the operating system of the client. This WRITE command is received by the acceleration application of the client and handled in the manner described below. If the TCPIP server wants to send a message to the client, the TCPIP server writes the message to the TCPIP stack of TCPIP operating system, on the connection to the agent, since this agent is where the server received the original connection. This WRITE command is received by the acceleration application of the agent and handled in the manner described below.

When the acceleration application of the client receives a message from the network application of the client to be sent to the agent, or when the acceleration application of the agent receives a message from the connection to the TCPIP server that is to be sent to the client, the acceleration application proceeds to send the message to the communication device on the other side. For instance, if the client has intercepted the message from the communication application, the client sends the message to the agent, and if it is the agent that intercepted the message from the connection to the TCPIP server, such as the TCPIP server sending a message that is intended for the communication with client, the agent sends the message to the client in the following manner:

As shown by block 804, the acceleration application breaks up the content of the message to chunks and calculates the corresponding checksums, in the same manner as in the main embodiment described herein. The acceleration application then looks up each checksum in its cache database (block 806). As shown by block 808, the acceleration application checks if the checksum exists in the cache database. Hit does, then, as shown by block 810, the acceleration application prepares a list of peers that have already received the chunk of the checksum in the past (if any), and adds the communication device of the other side to the list of communication devices that have received this chunk (adds it to the peer list of the checksum in its database), to be provided to other communication devices requesting this information in the future. As shown by block 812, the list of peers is sent to the receiving communication device, which, as shown by block 814 retrieves the chunks from the peers in the list received, in the same manner as in the main embodiment.

If the checksum does not exist within the cache database of the sending communication device then, as shown by block 820, the acceleration application adds the checksum and chunk to its cache database, sends the chunk to the communication device on the other side, and adds the other communication device to the list of peers for that checksum in its database.

As shown by block 816, a determination is then made as to whether all chunks have been received. If all chunks have not been received, the process continues on again from block 806.

Once all data has been received, as shown by block 818, the acceleration application passes the data on to the requester. Specifically, in the client, the acceleration application passes on the complete data to the communication application, and in the agent, the acceleration application passes on the complete data to the requesting TCPIP server.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A method for fetching by a client device a first content identified by a first content identifier stored in a first web server and a second content identified by a second content identifier stored in a second web server, for use with first and second devices and a third server, wherein each of the client device, the first and second devices and the third server is identified in the Internet using a respective identifier, the method comprising:
providing, by the third server to the client device, the identifier of the first device;
establishing, by the client device a first connection with the first device using the provided first device identifier;
obtaining, by the client device from the first device, the first content;
notifying, by the client device to the third server, of the obtaining of the first content;
providing, by the third server to the client device, the identifier of the second device;
establishing, by the client device a second connection with the second device using the provided second device identifier;
obtaining, by the client device from the second device, the second content; and
notifying, by the client device to the third server, of the obtaining of the second content.

2. The method according to claim 1, further comprising: sending, by the client device to the third server, a first request; and sending, by the client device to the third server, a second request, wherein the providing of the identifier of the first device is in response to the received first request, and wherein the providing of the identifier of the second device is in response to the received second request.

3. The method according to claim 2, for use with a group of identifiers of devices that includes the first and second devices, the method further comprises selecting, by the third server, the identifier of the first device in response to the first request; and selecting, by the third server, the identifier of the second device in response to the second request.

4. The method according to claim 3, wherein the selecting of the identifier of the first or second device is based on former activity respectively with the first or second device.

5. The method according to claim 4, wherein the selecting of the identifier of the first or second device is based on a response time.

6. The method according to claim 4, wherein the selecting of the identifier of the first or second device is based on being the quickest to respond to queries.

7. The method according to claim 2, wherein the first request comprises the first content identifier, and wherein the first request comprises the second content identifier.

8. The method according to claim 2, wherein the first request comprises a first geographical location, and wherein the first request comprises a second geographical location.

9. The method according to claim 1, wherein each of the first and second web servers is a publicly-accessed Hypertext Transfer Protocol (HTTP) or Hypertext Transfer Protocol Secure (HTTPS) server that respectively responds to HTTP or HTTPS requests.

10. The method according to claim 9, wherein the establishing of the first and second connections respectively comprise sending of a HTTP or HTTPS requests for the first and second content.

11. The method according to claim 10, wherein the HTTP or HTTPS requests for the first and second content respectively comprise the first and second content identifier, and wherein each of the HTTP or HTTPS requests is based on HTTP 'GET' request.

12. The method according to claim 1, further comprising executing, by the client device, an application.

13. The method according to claim 12, wherein the application comprises a web/Internet browser application or an email application.

14. The method according to claim 13, wherein the application comprises a web/Internet browser application, and wherein the method further comprising identifying, by the client device, the first or second content identifiers, where the identifying comprises intercepting, by a driver in the client device, the request for the first or second content respectively from the application.

15. The method according to claim 1, wherein each of the first and second content consists of, or comprises, a web-page or a portion thereof.

16. The method according to claim 15, wherein each of the first and second content consists of, or comprises, a resource or an HTML object of a web-page.

17. The method according to claim 1, wherein each of the first and second content identifiers comprises, or consists of, a Uniform Resource Locator (URL).

18. The method according to claim 1, wherein each of the first and second connections comprises, or is based on, Transmission Control Protocol (TCP) connection.

19. The method according to claim 1, wherein the client device comprises a wireless modem for Radio-Frequency (RF) communication, and wherein each of the first and second connections is based on, or uses, RF communication.

20. The method according to claim 1, further comprising periodically communicating between the third server and the client device.

21. The method according to claim 20, wherein the periodically communicating comprises exchanging 'keep alive' messages.

22. The method according to claim 1, wherein the client device is identified by an Internet Protocol (IP) address, Media Access Control (MAC) address, or a hostname, and wherein the method further comprising sending, by the client device, during, as part of, or in response to, a start-up of the requesting client device, a message to the third server that respectively comprises the IP address, the MAC address, or the hostname.

23. The method according to claim 22, for use with a first application stored in the client device and associated with a first version number, wherein the sending comprises sending the first version number.

24. The method according to claim 1, wherein the identifier of the first device comprises, or consists of, a first Internet Protocol (IP) address, wherein the identifier of the second device comprises, or consists of, a second Internet Protocol (IP) address.

25. The method according to claim 1, wherein the client device communicates over the Internet based on, or according to, one out of UDP, DNS, FTP, POP#, SMTP, or SQL standards.

26. The method according to claim 1, further comprising storing, by the client device, the received first content and the received second content; and sending a communication port number to the third server, wherein the communication with the third server is using the communication port number.

27. The method according to claim 1, further comprising determining, by the client device, that the received first content, or part thereof, is valid, wherein the determining is based on a received HTTP header that is according to, or based on, IETF RFC 2616.

28. The method according to claim 1, wherein the steps are sequentially executed.

29. The method according to claim 1, wherein the obtaining the first content from the first web server comprises sending, by the first device to the first web server, the first content identifier; receiving, by the first device from the first web server, the first content; and sending, by the first device to the client device, the received first content, and wherein the obtaining the second content from the second web server comprises sending, by the second device to the second web server, the second content identifier; receiving, by the second device from the second web server, the second content; and sending, by the second device to the client device, the received second content.

30. The method according to claim 1, wherein the first device stores the first content, and wherein the obtaining the first content from the first web server comprises sending, by the first device to the client device, the first content.

\* \* \* \* \*